(12) United States Patent
Lovell et al.

(10) Patent No.: US 12,181,052 B2
(45) Date of Patent: Dec. 31, 2024

(54) PACKING SYSTEM AND DIAGNOSTIC METHOD FOR A PACKING SYSTEM OF A VALVE ASSEMBLY

(71) Applicant: Fisher Controls International LLC, Marshalltown, IA (US)

(72) Inventors: Michel K. Lovell, Marshalltown, IA (US); Trent Jackson, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 18/506,501

(22) Filed: Nov. 10, 2023

(65) Prior Publication Data
US 2024/0077140 A1  Mar. 7, 2024

Related U.S. Application Data

(63) Continuation of application No. 17/751,965, filed on May 24, 2022, now Pat. No. 11,852,248.

(51) Int. Cl.
| | |
|---|---|
| *F16K 1/42* | (2006.01) |
| *F16K 17/00* | (2006.01) |
| *F16K 17/38* | (2006.01) |
| *F16K 27/02* | (2006.01) |
| *F16K 41/02* | (2006.01) |

(52) U.S. Cl.
CPC .............. *F16K 1/42* (2013.01); *F16K 17/003* (2013.01); *F16K 17/38* (2013.01); *F16K 27/02* (2013.01); *F16K 41/02* (2013.01)

(58) Field of Classification Search
CPC .......... F16K 1/42; F16K 17/003; F16K 17/38; F16K 27/02; F16K 41/02; F16K 41/003; F16K 41/04; F16K 37/0091; F16J 15/183; F16J 15/186; F16J 15/3296
See application file for complete search history.

(56) References Cited

U.S. PATENT DOCUMENTS

| | | |
|---|---|---|
| 1,572,922 A | 2/1926 | Govers et al. |
| 2,188,664 A | 1/1940 | Mochel |
| 3,105,513 A | 10/1963 | Ray |
| 5,230,498 A | 7/1993 | Wood et al. |

(Continued)

OTHER PUBLICATIONS

Fisher™ ENVIRO-SEAL™ and High-Seal Packing Systems for Sliding-Stem Valves (Live-Loaded) Product Bulletin, www.Fisher.com, Aug. 2021, p. 1-12.

*Primary Examiner* — Patrick C Williams
(74) *Attorney, Agent, or Firm* — Quarles & Brady LLP

(57) ABSTRACT

A packing system is disclosed for use with a valve having a bonnet and a flow passage extending between an inlet and an outlet of a valve body. A bore can extend through the bonnet to receive a stem that moves a control member to control flow through the flow passage. A first packing arrangement can be arranged in the bore about a first portion of the stem. A second packing arrangement can be arranged in the bore about a second portion of the stem with the first packing arrangement between the second packing arrangement and the valve body. A bore port can extend through the bonnet and open into an inter-packing volume of the bore between the first and second packing arrangements and can provide fluid communication between the inter-packing volume and the outlet of the valve or other lower pressure area.

20 Claims, 10 Drawing Sheets

(56) References Cited

U.S. PATENT DOCUMENTS

| | | | |
|---|---|---|---|
| 5,299,812 A | 4/1994 | Brestel et al. | |
| 5,709,514 A | 1/1998 | Suggs et al. | |
| 9,500,300 B2 | 11/2016 | Daigle | |
| 9,528,631 B2 | 12/2016 | McCarty | |
| 2010/0320411 A1* | 12/2010 | King | F16K 41/02 |
| | | | 251/366 |

* cited by examiner

PACKING SYSTEM AND DIAGNOSTIC METHOD FOR A PACKING SYSTEM OF A VALVE ASSEMBLY

CROSS-REFERENCE TO RELATED APPLICATIONS

The present application is a continuation of U.S. patent application Ser. No. 17/751,965, titled "PACKING SYSTEM AND DIAGNOSTIC METHOD FOR A PACKING SYSTEM OF A VALVE ASSEMBLY" and filed May 24, 2022, the entirety of which is incorporated herein by reference.

BACKGROUND

Valve assemblies, including control valves, can be used in a wide variety of applications including process plants such as refineries, chemical plants, and paper plants, among many others. In some applications, a packing system of a control valve can help to limit fugitive emissions from the packing system. For example, arrangements of packing material can surround a valve stem of a control valve to help prevent leakage of process fluid past the valve stem to the ambient environment.

SUMMARY

Some embodiments of the invention provide a packing system for use with a valve. The valve can include a valve body having an inlet, an outlet, and a flow passage extending between the inlet and the outlet. The packing system can include a bonnet configured for connection to the valve body. A bore can extend through the bonnet and open into the valve body to receive a stem of the valve so that the stem moves within the bore to move a control member in the flow passage to control flow through the flow passage. The packing system can include a first packing arrangement and a second packing arrangement. The first packing arrangement can be arranged in the bore about a first portion of the stem. The second packing arrangement can be arranged in the bore about a second portion of the stem so that the first packing arrangement is located between the second packing arrangement and the valve body. The packing system can include a bore port extending through the bonnet and opening to an inter-packing volume of the bore between the first packing arrangement and the second packing arrangement. The bore port can provide fluid communication between the inter-packing volume and the outlet of the valve.

In some embodiments, a packing system can include a bore port in fluid communication with an outlet of a valve via an outlet port that opens into a portion of a flow passage that is downstream of a control member. The outlet port and the bore port can be in fluid communication via an external flow path that extends outside of a valve body and a bonnet.

In some embodiments, a packing system can include a bore port in fluid communication with an outlet of a valve via a bonnet passage extending within a body of a bonnet. In some embodiments, a packing system can include a bonnet passage extending within a body of a bonnet from a bore port to an interface between the bonnet and a valve body, and a check valve can be disposed within the bonnet and configured to control flow along the bonnet passage. In some embodiments, a packing system can include a bonnet port extending through the bonnet and in fluid communication with a flow passage via an interface between the bonnet and a valve body, and a bore port and the bonnet port can be in fluid communication via a flow path that is external to the bonnet.

In some embodiments, a packing system can include a first packing arrangement that is a labyrinth seal configured to have a first leakage rate that is greater than a second leakage rate of a second packing arrangement.

In some embodiments, a packing system can include a pressure relief valve in fluid communication with a bore port and an outlet of the valve to define a set pressure for flow between the bore port and the outlet of the valve. In some embodiments, a packing system can include a first pressure sensor, a second pressure sensor, a temperature sensor, and a block valve. The first pressure sensor can be arranged upstream of a pressure relief valve in fluid communication with a bore port. The second pressure sensor can be arranged downstream of the pressure relief valve in fluid communication with an outlet of the valve. The temperature sensor can be arranged to measure temperature of flow from the bore port to the outlet of the valve. The block valve can be configured to selectively bypass flow that bypasses the pressure relief valve.

In some embodiments, a packing system can include a lantern ring that is disposed in an inter-packing volume of a bore between a first packing arrangement and a second packing arrangement. The lantern ring can be in fluid communication with a bore port.

Some embodiments of the invention provide a valve assembly. The valve assembly can include a valve body that has an inlet, an outlet, and a flow passage that extends between the inlet and the outlet. A bonnet can be mounted to the valve body and can include a bore that opens into the valve body. A stem can extend through the bore and can be operatively connected to a control member arranged in the flow passage of the valve body. The stem can be configured to move the control member between a closed position and an open position to control flow through the flow passage. A first packing arrangement can be arranged in the bore about a first portion of the stem. A second packing arrangement can be arranged in the bore about a second portion of the stem and downstream of the first packing arrangement along a leakage flow path through the bore. A bore port can extend through the bonnet to provide fluid communication between (i) an inter-packing location of the bore that is between the first packing arrangement and the second packing arrangement and (ii) one or more of: the outlet of the control valve, or a vacuum source.

In some embodiments, a valve assembly can include a bore port in fluid communication with an outlet of the valve via an outlet port that extends through an outlet portion of a valve body to receive flow from a location in a flow passage that is downstream of a control member. In some embodiments, a valve assembly can include an outlet port in fluid communication with a flow passage via a pitot tube that is arranged within the flow passage so that flow from a control member to an outlet within the flow passage generates a reduced pressure at the pitot tube. In some embodiments, a valve assembly can include an outlet port in fluid communication with a flow passage via a venturi tube that is arranged within the flow passage so that flow from a control member to an outlet within the flow passage generates a reduced pressure at the venturi tube.

In some embodiments, a valve assembly can include a bore port in fluid communication with the outlet of the control valve via a bonnet passage that extends through a portion of the bonnet adjacent to the control member. In some embodiments, a valve assembly can include a control member that is surrounded by a cage within a valve body, and a bonnet passage can be in fluid communication with an outlet of the valve via a cage passage that extends through a portion of the cage.

In some embodiments, a valve assembly can include a vacuum source. The vacuum source can include a pump that is configured to draw pressure from an inter-packing location within a bore of a bonnet. In some embodiments, a valve assembly can include a first packing arrangement that is a labyrinth seal configured to have a first leakage rate that is greater than a second leakage rate of a second packing arrangement.

Some embodiments of the invention provide a method of evaluating a seal provided by a packing system for a valve, with respect to a leakage flow path from the valve that extends between an area of system pressure for the valve and an exterior of the valve. The method can include determining a rate of increase of an inter-packing pressure that is a pressure of an inter-packing volume that is along the leakage flow path between an upstream packing arrangement and a downstream packing arrangement of the packing system. The method can also include determining a reference pressure at a reference location that is downstream of the inter-packing volume along a sensing flow path. The method can include calculating a leakage rate of the upstream packing arrangement of the packing system based on the rate of increase and the reference pressure. The method can also include, before determining the rate of increase of the inter-packing pressure, opening a block valve to place the inter-packing volume in fluid communication with the reference location so that the inter-packing pressure decays to the reference pressure via the block valve. The method can include, after the inter-packing pressure decays to the reference pressure, closing the block valve. In some embodiments, the sensing flow path can provide fluid communication between the inter-packing volume and an outlet of the valve.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
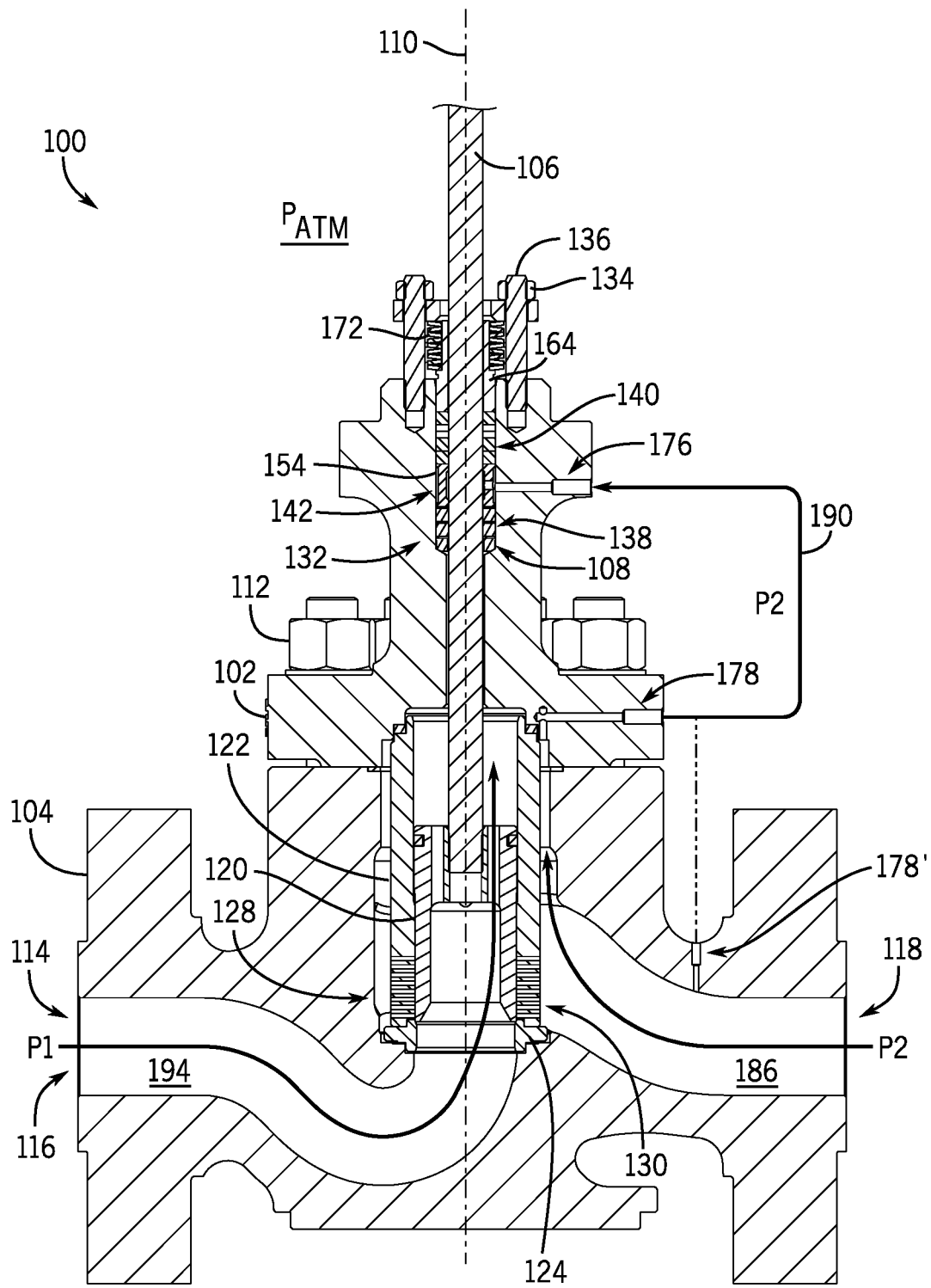
FIG. 1 is a cross-sectional partly schematic view of an embodiment of a valve assembly with a packing arrangement, during operation, in accordance with principles of the present disclosure.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items. The use of "about" or "approximately" and variations thereof herein is meant to refer to variation in the numerical quantity that may occur, for example, through the measuring of pressures or temperatures within various portions of a valve assembly that may include embodiments of the disclosure herein; through inadvertent error in these procedures; through differences in the accuracy or precision of various components used to carry out the methods; and the like. Throughout the disclosure, the terms "about" and "approximately" are intended to refer to a range of values ±5% of the numeric value that the term proceeds, inclusive.

Also as used herein, "leakage rate" and variations thereof is meant to refer to a mass flow rate of leakage from an inlet of the valve assembly along a path to an ambient area, particularly through a packing system or portion thereof. For example, a "leakage rate" can refer to a collective mass flow rate of leakage through two (or more) packing arrangements of a packing system that are arranged in series along a common leakage path from the inlet of the valve assembly to an ambient area. Thus, a packing system with a "higher leakage rate" and variations thereof generally permits a higher rate of mass flow from a valve inlet through the packing system than does a packing system with a "lower leakage rate." Similarly, for example, a "first leakage rate" can refer to a first mass flow rate of leakage through a first packing arrangement of a packing system, a "second leakage rate" can refer to a second mass flow rate of leakage through a second packing arrangement of the packing system that is arranged in series along the common leakage path of the packing system, and a collective "leakage rate" of the packing system can refer to the collective mass flow rate of leakage through the first and second packing arrangements of the packing system. Thus, a first packing arrangement can have a "first leakage rate" that is different than a "second leakage rate" of a second packing arrangement.

In some cases, a factor, such as, for example, a leakage rate of one or more packing arrangements of a packing system, can provide an indication of the variable leakage rate of the packing system, including as can indicate degradation of sealing performance during the lifecycle of the packing system. In some embodiments, other factors may be used to quantify or track the variable leakage rate of the packing system. In addition, the use of "fugitive emissions" and variations thereof herein is meant to refer to leakage from the packing system to the atmosphere surrounding the valve assembly.

Some discussion below refers to "vacuum" or to a "vacuum source." As used herein, these terms indicate an area or device that can expose a first area of a flow system to a pressure that is below ambient pressure (e.g., atmospheric pressure) for the flow system. For example, in a flow system configured to operate in atmospheric surroundings (i.e., approximately 1 bar), with an internal pressure of 100 bar at an inlet of a control valve, a vacuum source relative to the flow system may provide an area of pressure of less than approximately 1 bar, including as can be selectively placed in fluid communication with the inlet of the control valve (e.g., via communication with a leakage path between the inlet and the surroundings).

As briefly discussed above, valve assemblies can be used to control flowrate for a process fluid flowing from a fluid source toward a downstream application. A valve assembly, for example, can have a main valve inlet and a main valve outlet. A main flow passage can extend between the main valve inlet and the main valve outlet and through a main valve body. The main valve body can include a control member, such as a valve plug or a valve disc, for example, to manipulate a process fluid or gas flowing through a pipeline, such as a steam, water, natural gas, oil, or other chemical compounds. The control member is typically moved by an operating member, such as a sliding valve stem or a rotary shaft, that extends through a bore in the valve body. To prevent leakage or fugitive emissions of the process fluid or gas around the operating member, a packing arrangement is typically disposed about the operating member in the bore of the valve body.

Many process applications, including those involving aromatic or chlorinated hydrocarbons, utilize control valves that tend to leak small amounts of process fluid into the surrounding environment. Conventional solutions to reduce fugitive emissions involve placing a metal bellows seal around the operating member to capture process leakage or exerting compressive stress on packing material to create a tight seal between the operating member and the valve body bore. However, these solutions can have undesirable effects on the operation and performance of the control valve. For instance, increasing the packing stress tends to increase the friction experienced by the operating member. The increased friction impedes movement of the operating member, which, in turn, can make it difficult to monitor and control the position of the operating member. Higher levels of friction also may necessitate a larger actuator, which can increase the operating and manufacturing costs associated with the control valve. Further, increased friction can accelerate degradation of packing material, and thus require more frequent maintenance to prevent unwanted emissions.

Modern sliding stem control valves commonly utilize pressure-balanced trims to minimize actuator force requirements. The pressure-balanced trim uses a sliding seal that separates the upstream pressure from the downstream pressure. In such valve assemblies, the flow direction of the control valve determines whether the upstream pressure or the downstream pressure acts on the stem packing arrangement. For optimal packing performance in such control valves it is advantageous to expose the stem packing to the downstream pressure, which can be a significantly lower pressure than the upstream pressure. This arrangement in such valve assemblies is known as a "flow down" direction. However, in many applications, a "flow down" configuration is not practically feasible and instead a "flow up" configuration can be utilized with the stem packing exposed to the upstream pressure. For example, a "flow up" valve assembly may be required for process fluid flows at relatively high pressure or high temperature (e.g., at greater than 450° F. or 750 psi).

In high pressure, high temperature applications compression packing arrangements are commonly utilized in sliding stem control valves to limit fugitive emissions through the bore of the valve body. A packing follower applies stress to the packing in excess of the process pressure to affect a tighter seal. However, under conventional solutions, these compression packing arrangements create a significant amount of friction, which leads to wear of the packing arrangement. Increased friction can also degrade the dynamic performance of the control valve and often results in larger actuators that increase the cost of the control valve assembly, as discussed above.

Embodiments of the invention can address these issues, including by providing a valve assembly in which a reduced pressure is provided at an intermediary area of a packing arrangement. In some embodiments, a control valve can be configured so that the downstream pressure of the valve acts on the packing arrangement or system regardless of the valve flow direction. For example, some embodiments provide a valve assembly having a packing system including an upstream (e.g., first or lower) packing arrangement and a downstream (e.g., second or upper) packing arrangement that collectively define at least part of an inter-packing volume between the two packing arrangements. A bore port extends through the valve assembly (e.g., through a bonnet thereof) and opens into the inter-packing volume of the packing system. Thus, a reduced pressure area can be placed in communication with the inter-packing volume and, as further detailed below, improved control of emissions can be implemented.

In some embodiments, an outlet port in communication with an inlet port as described above can open into a volume of the valve flow passage downstream of the control member. The inter-packing volume of the packing system can thus be in fluid communication with an outlet volume of the valve flow passage along a flow path between the bore port and the outlet port that is distinct from a main flow path through the valve assembly past the control member (e.g., along an externally plumbed flow path). This alternate (e.g., external) flow path can expose the inter-packing volume to a downstream pressure when the control member is in a closed position, in which process fluid is not permitted to flow through the valve flow passage, as well as when the control member is in an open position. In such instances, a pressure differential across the packing system from the inter-packing volume to atmosphere can be reduced, along with the required compression of the corresponding packing arrangement to prevent unwanted emissions along a leakage flow path through the packing arrangement. As facilitated by the reduction of the pressure differential, operational stress applied on the packing system can also be reduced, and operating performance of the valve assembly can be generally improved, including due to reduced friction between the operating member and the packing arrangement.

In addition to exposing the inter-packing volume of the packing system to the downstream pressure, an inter-packing flow path as described above can also permit leakage through the packing system to pass into downstream flow systems rather than to the ambient surroundings. For example, leakage through a leakage flow path of a packing system can enter the inter-packing volume through an upstream or lower packing arrangement, then flow out of the inter-packing volume to downstream systems (e.g., further process piping and equipment), rather than increasing the inter-packing pressure and thereby leaking through a downstream or upper packing arrangement to the atmosphere. Accordingly, in some embodiments, different packing arrangements within a packing system can be configured with different sealing efficacy and compression pressures, as can allow use of more economical arrangements while still providing improved protection against fugitive emissions. For example, an upstream packing arrangement can be a labyrinth seal having a first leakage rate that is greater than a second leakage rate of a downstream packing arrangement. In some cases, the pressure-leakage characteristics of a labyrinth seal in particular can permit the inter-packing pressure to gradually increase, such that excess leakage can reliably flow out the inter-packing flow path to downstream systems.

In some embodiments, an outlet port can include (or be in communication with) a vacuum source arranged in the outlet volume, which can expose the inter-packing volume to vacuum when the control member is in the open position and process fluid is permitted to flow through the valve flow passage. In some embodiments, a vacuum source can be integrally formed in a valve body or a cage of the valve assembly. Generally, a vacuum source thus arranged can reduce the inter-packing pressure and, in some embodiments, can further reduce the inter-packing pressure of the inter-packing volume to below an atmospheric pressure. In some embodiments, a check valve can be arranged along the inter-packing flow path that can maintain the reduced pressure within the inter-packing volume when the control member is moved to the closed position. Additionally, or alternatively, a vacuum pump can be arranged along the inter-packing flow path that can be operated to maintain the reduced pressure or vacuum within the inter-packing volume when the control member is in the closed position (or also in the open position).

Embodiments of the invention can also provide a valve assembly having a packing diagnostic system. For example, a diagnostic system can be configured to evaluate the sealing performance or other health indicators for a packing system (or of one or more packing arrangements of the packing system) by monitoring pressure signals for upstream and downstream of a pressure relief valve disposed along an inter-packing flow path. For example, using a block valve disposed in parallel to a pressure relief valve and two or more pressure gauges, a leakage rate of an upstream packing arrangement of the packing system can be determined (e.g., as an average leakage rate). Further, in some embodiments, an average leakage rate of an upstream packing arrangement can be used to determine a mass flow rate of leakage through the upstream packing arrangement over a certain amount of time. In some embodiments, a temperature gauge or transmitter may be similarly arranged along an inter-packing flow path, including to help alert a user of a potential increase in a leakage rate of an upstream packing arrangement.

In some embodiments, the determination and tracking of one or more factors of the packing system may be automated. For example, in some embodiments, a diagnostic system can further include a control unit that controls the block valve and receives signals from two or more pressure transmitters or temperature transmitters. A processor of the control unit can be configured to determine a flow factor (e.g., a leakage rate of an upstream packing arrangement) using pressure values stored in a memory of the control unit. In some embodiments, a maximum leakage rate can be set by a user and stored in the memory of the control unit and the control unit can be configured to alert a user that the packing system requires service or needs to be replaced once the leakage rate of the upstream packing arrangement reaches or exceeds the set maximum leakage rate.

Embodiments of the invention can also provide a method for evaluating a seal provided by the packing system (or of one or more packing arrangements of the packing system) of a valve assembly, including for a valve assembly having a diagnostic system as described above. For example, the method can include determining one or more factors that are indicative of the seal performance, such as a leakage rate of the packing system (or of one or more packing arrangements of the packing system).

The principles of the present disclosure are applicable to various types of valve assemblies, such as sliding stem control valves and rotary shaft control valves, as well as, various packing arrangements, such as jam-style or live-loaded, and various packing materials, such as polytetrafluoroethylene (PTFE) and graphite.

Figure 2:
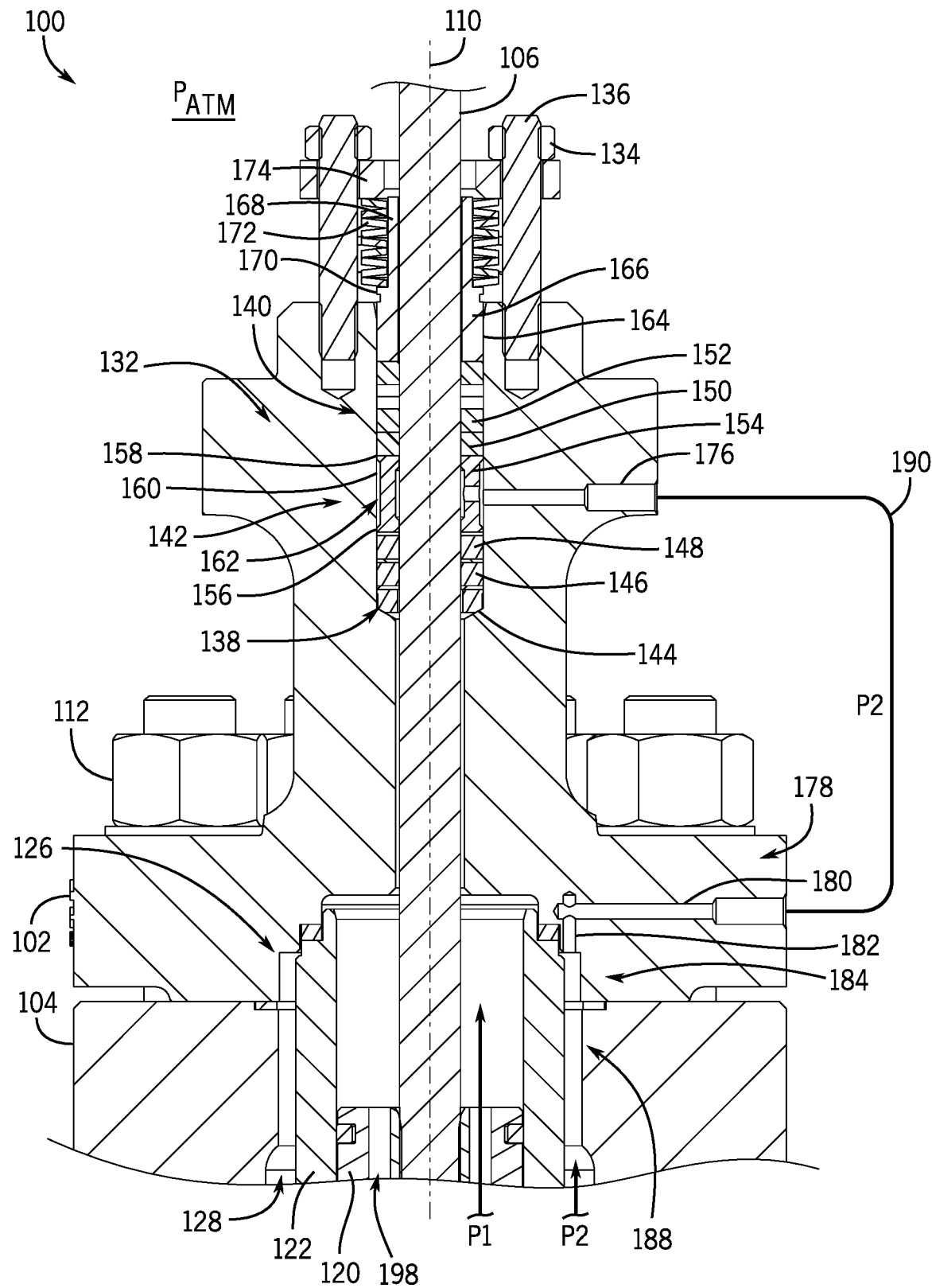
FIG. 2 is an enlarged view of a portion of the valve assembly of FIG. 1.

Referring now to FIGS. 1 and 2, an example of a valve assembly 100 is illustrated. Referring specifically to FIG. 1, the valve assembly 100 is a control valve of the sliding stem type, having a packing system in accordance with the principles of the present disclosure. The illustrated portion of the valve assembly 100 in FIG. 1 includes a bonnet 102 mounted on a valve body 104 and an operating member, shown as sliding stem 106, that extends through a bore 108 formed in the bonnet 102 along a central axis 110. Fasteners 112 may be used to removably secure the bonnet 102 to the valve body 104. A valve flow passage 114 extends through the valve body 104 between an inlet 116 and an outlet 118 and provides a path for a process liquid or gas to flow through the valve assembly 100. The process liquid or gas may be any fluid or gas, including steam, water, natural gas, oil or other chemical compounds. The valve flow passage 114 is opened and closed by a control member 120 which is movable by the sliding stem 106 between a closed position and an open position within a cage 122 that is arranged within the valve flow passage 114. One end of the cage 122 contacts a valve seat 124 and the other end of the cage 122 engages a guide 126 (see FIG. 2) disposed on a bottom side of the bonnet 102 concentric with the central axis 110, such that the cage 122 is arranged partially within the guide 126 of the bonnet and partially within an opening 128 of the valve body 104.

With the valve assembly 100 in the closed position, as shown in FIG. 1 in particular, the control member 120 sealingly engages the valve seat 124 to prevent the process fluid or gas from passing through the control valve 100. In the open position (not shown), the control member 120 is raised from the valve seat 124 to allow the process fluid or gas to pass from the inlet 116 through holes 130 (or other windows) of the cage 122 to the outlet 118. Movement of the control member 120 is accomplished by coupling the control member 120 to an actuator (not shown) by way of the sliding stem 106. The actuator controllably moves the sliding stem 106 linearly along the central axis 110 of the bore 108 in the upward and downward directions, thereby causing the control member 120 to move between the open and closed positions, as well as other intermediate positions.

Still referring to FIGS. 1 and 2, a packing system 132 of the valve assembly 100 includes a first, lower (upstream) packing arrangement 138 arranged in a lower part of the bore 108 about a lower portion of the sliding stem 106, and a second, upper (downstream) packing arrangement 140 arranged in an upper part of the bore 108 about an upper portion of the sliding stem 106. Generally, mechanical force can be used to collectively compress the packing arrangements 138, 140 to ensure appropriate sealing performance. For example, in the example shown, a series of packing nuts 134 are threadably mounted on respective packing studs 136 so as to adjust the loading on the packing within the bore 108 and around the sliding stem 106.

In the illustrated example, the first and second packing arrangements 138, 140 define an inter-packing volume 142 within the bore 108. Referring specifically to FIG. 2, the first packing arrangement 138 includes a first, bottom ring 144, a second, middle ring 146, and a third, upper ring 148. The rings 144, 146, 148 may be formed of a PTFE material, or any other suitable synthetic resin polymer. In some embodiments, a carbon bushing may be provided at each end of the first packing arrangement 138. In some embodiments, the rings 144, 146, 148 of the first packing arrangement 138 may be V-rings with a male or female adapter. In some embodiments, the first packing arrangement 138 can include a single ring, two rings, or four or more rings.

Similarly, with continued reference to FIG. 2, the second packing arrangement 140 includes a first, lower ring 150 and a second, upper ring 152. The rings 150, 152 of the second packing arrangement 140 may be formed of a PTFE material, or any other suitable synthetic resin polymer. In some embodiments, a carbon bushing may be provided at each end of the second packing arrangement 140. In some embodiments, the rings 150, 152 of the second packing arrangement 140 may be V-rings with a male or female adapter. In some embodiments, the second packing arrangement 140 can include a single ring or three or more rings.

To provide for improved overall performance, as also generally discussed above, the first and second packing arrangements 138, 140 collectively define the inter-packing volume 142 within the bore 108. For example, as shown in FIG. 2 in particular, the packing arrangements 138, 140 are spaced apart from each other by a spacer, which thus also partly defines the inter-packing volume 142. In the illustrated embodiment, in particular, a lantern ring 154 is disposed around the sliding stem 106 and within the inter-packing volume 142 of the bore 108 between the first packing arrangement 138 and the second packing arrangement 140. The lantern ring 154 has a first, lower end 156, a second, upper end 158, and a middle portion 160 extending between the first end 156 and the second end 158. The middle portion 160 has a reduced diameter relative to the first and second ends 156, 158. In some cases, the diameter of the middle portion 160 may be less than the diameter of the bore 108 so that an annular gap 162 exists between the middle portion 160 of the lantern ring 154 and the inner wall of the bore 108. Thus, as further described below, in the illustrated embodiment, this annular gap 162 at least partially defines the inter-packing volume 142 of the bore 108. In other cases, other flow volumes for an inter-packing volume can be otherwise defined, including by features of upstream or downstream packing arrangements.

Still referring to FIG. 2, a packing follower 164 is disposed partially within the bore 108 above the second packing arrangement 140. The packing follower 164 has a follower base 166 at one end, a follower guide sleeve 168 at the other end, and a follower flange 170 extending between the follower base 166 and the follower guide sleeve 168. A series of disk springs 172, such as Belleville springs, are slidably mounted on the follower guide sleeve 168 with one end of the disk springs 172 in contact with the follower flange 170 and the other end of the disk springs 172 in contact with a packing flange 174. The packing studs 136 and sliding stem 106 pass through respective apertures in the packing flange 174.

After assembling the first and second packing arrangements 138, 140 within the bore 108 and around the sliding stem 106, the packing nuts 134 on the packing studs 136 are tightened so that the packing flange 174 transmits the nut load to the disk springs 172. The disk springs 172 compress with continued tightening of the packing nuts 134 so as to maintain a spring load on the first and second packing arrangements 138, 140 by way of the packing follower 164. The compression of the rings 144, 146, 148, 150, 152 of the first and second packing arrangements 138, 140 causes them to sealingly engage the sliding stem 106 and the inner wall of the bore 108. In some embodiments, other generally known components or arrangements of components can be included in the valve assembly 100, in addition to or instead of the packing follower 164 and disk springs 172, to compress the rings 144, 146, 148, 150, 152 of the first and second packing arrangements 138, 140 as described above.

With continued reference to FIGS. 1 and 2, the valve assembly 100 of the present disclosure includes a first port or bore port 176 extending through an upper portion of the bonnet 102 and into the inter-packing volume 142, such that the bore port 176 is in fluid communication with the inter-packing volume 142 within the bore 108. The bore port 176 may, for example, be a passageway that extends between the bore 108 and the exterior of the bonnet 102 such that one end of the bore port 176 opens into the inter-packing volume 142 within the bore 108 and the other end of the bore port 176 opens to the exterior of the valve assembly 100. In particular, the bore port 176 can open into the inter-packing volume 142 between the first packing arrangement 138 and the second packing arrangement 140, relative to a leakage flow path generally along the direction of central axis 110. In some cases, the bore port 176 may be aligned with the middle portion 160 of the lantern ring 154 such that the bore port 176 communicates directly with the annular gap 162 (i.e., an inter-packing location) defined by the middle portion 160 of the lantern ring 154. In some embodiments, a check valve may be arranged in or in communication with the bore port 176 to permit the flow of fluid out of the bore 108 at the inter-packing volume 142 and inhibit the flow of fluid into the bore 108 at the inter-packing volume 142.

In some embodiments, it may be possible to utilize a pre-existing lubrication port of the valve assembly as the bore port 176. Lubrication ports are included on many valve assemblies, including conventional control valves, for the purpose of introducing lubricant into the bore to reduce the sliding friction between the sliding stem and the packing system. Accordingly, some valve assemblies may be outfitted with the packing system in accordance with principles of the present disclosure without substantially altering the design or configuration of the valve assembly at large, including by configuring a retrofit packing system to define an inter-packing volume, between upstream and downstream packing arrangements, that is appropriately in fluid communication with the pre-existing lubrication port.

Generally, a bore port in communication with an inter-packing volume can be placed in communication with an area of relatively low pressure. In some cases, a bore port can be placed in communication with a downstream portion of the flow system that is controlled by the control valve (e.g., at a downstream portion of a main valve body). Referring to FIGS. 1 and 2 in particular, for example, the valve assembly 100 can include an outlet port 178 (or 178', in some configurations) through which the inter-packing volume 142 can be placed in fluid communication with the outlet 118 of the valve assembly 100 (e.g., via an external flow path 190 between the bore port 176 and the outlet port 178). Thus, during operation of the valve assembly 100 pressure in the inter-packing volume 142 from leakage past the first packing arrangement 138 can equilibrize with pressure at the outlet 118, as may correspond to a lower pressure at the upstream end of the second packing arrangement 140 than in corresponding conventional arrangements. Correspondingly, a pressure differential across the second packing arrangement 140 (i.e., between the inter-packing volume 142 and atmosphere) can be relatively low, allowing for more effective sealing at the second packing arrangement 140 as compared to conventional arrangements.

In different embodiments, a flow passage between a bore port and an outlet port can be provided with different flow structures, including for flows that are external to a valve body or bonnet and for flows that extend along internal passages within a valve body or bonnet. In one example, as illustrated in FIG. 2 in particular, the outlet port 178 can include a first passageway 180 and a second passageway 182 that together define a bonnet passage extending within the body of the bonnet 102. The first passageway 180 extends from the outlet port 178, which is disposed on an exterior surface of the bonnet 102, toward the central axis 110 of the bonnet 102. The second passageway 182 extends within the body of the bonnet 102, and in the direction of the central axis 110, from an inner end of the first passageway 180 to the guide 126 of the bonnet 102, such that it opens into a first annular gap 184 between the cage 122 and a side wall of the guide 126 of the bonnet 102. When the bonnet 102 is secured to the valve body 104, the first gap 184 is in fluid communication with a second gap 188 that is defined by a side wall of the cage 122 and by a side wall of the opening 128 of the valve body 104, at an interface between the bonnet 102 and the valve body 104. As such, the outlet port 178 is in fluid communication with an outlet volume 186 at the outlet 118 of the valve body 104 via the first and second gaps 184, 188 at the interface between the bonnet 102 and the valve body 104. In some embodiments, a sealing structure, such as, for example, two or more gaskets, may be disposed within the first and second gaps 184, 188, including to provide a uniform annular gap or to provide a seal at the interface between the bonnet 102 and the valve body 104.

In the illustrated embodiment of FIG. 1, and as described above, the valve assembly 100 is a stem-guided control valve having a "flow up" configuration. In the "flow up" configuration, the valve assembly 100 is capable of throttling flow of process fluid through the valve flow passage 114 between open and closed positions having a relatively high pressure drop, such as, for example, a pressure drop exceeding 1,000 pounds per square inch differential (psid) applied in the "flow up" direction. In this configuration, when the sliding stem 106 is in the closed position (as shown in FIGS. 1 and 2), an upstream pressure (P1) at an inlet volume 194 near the inlet 116 of the valve body 104 passes through a plurality of balance holes 198 (see FIG. 2) of the control member 120 to act on the first packing arrangement 138 of the packing system 132. The first packing arrangement 138 provides a seal or other substantial pressure drop between the inter-packing volume 142 of the bore 108, so as to substantially prevent leakage, as generally discussed above. Further, because of the inter-packing flow path between the bore port 176 and the outlet port 178, some pressure that passes through the first packing arrangement 138 and would otherwise accumulate at the inter-packing volume 142 is vented to the outlet 118, resulting in an inter-packing pressure ($P_{packing}$) of the inter-packing volume 142 that is substantially lower than the upstream pressure P1 (at the inlet volume 194). Thus, when the valve assembly 100 is in the closed position and the upstream pressure P1 acts on the packing system 132, some leakage across the first packing arrangement 138 can be diverted to the outlet 118 to maintain a relatively low pressure differential across the second packing arrangement 140 (i.e., a differential between the inter-packing pressure $P_{packing}$ and an atmospheric pressure $P_{atm}$) which can further reduce leakage across the second packing arrangement 140 to the surrounding environment.

As discussed above, in order to counteract leakage across the packing system 132 from the upstream pressure P1, the packing follower 164 is configured to apply a force in an axial direction along central axis 110 of the bore 108 onto the packing system 132. However, also as noted above, with increasing packing pressure can result in increased friction with the sliding stem 106, decreased efficiency, and decreased component lifespan. For reasons discussed above, as well as others that will be apparent to those of skill in the art, the packing arrangement provided by the example valve assembly 100 can help to counteract these negative effects while also reducing overall leakage as compared to conventional systems.

Correspondingly, in some embodiments, different types of packing arrangements can be used upstream and downstream of an inter-packing volume to provide further improvement of the performance, cost, and lifespan of the packing system while further limiting or eliminating fugitive emissions from the packing system 132. For example, the first packing arrangement 138 can be configured to have a first leakage rate, for a given pressure drop, that is greater than a second leakage rate of the second packing arrangement 140 of the packing system 132, for the given pressure drop. Thus, for example, a lower-compression upstream packing arrangement can be used to improve economics of manufacturing, with any increase in leakage across this upstream arrangement being balanced (and more) by the routing of leakage from the inter-packing volume (e.g., as discussed above) and the associated reduction in pressure differential to drive flow across the higher-compression downstream packing arrangement.

In some embodiments, the first packing arrangement 138 can thus be configured as a "labyrinth seal" that operates at the pressure differential of the valve assembly 100 (which is the same as the pressure differential across the packing system 132 with external flow path 190) and has the first leakage rate. With the labyrinth seal or first packing arrangement 138 operating at the pressure differential of the valve assembly 100, the inter-packing pressure $P_{packing}$ is permitted to gradually increase from a downstream pressure (P2) as the upstream pressure P1 gradually leaks through the labyrinth seal. Because the upstream pressure P1 is greater than the downstream pressure P2, the inter-packing pressure $P_{packing}$ will remain near the downstream pressure P2 as excess leakage is permitted to flow out of the inter-packing volume 142 along the external flow path 190 to the lower pressure outlet volume 186. Similarly, the labyrinth seal or first packing arrangement 138 enables the second packing arrangement 140 to operate with a reduced packing stress while effectively limiting fugitive emissions from the packing system 132 because the inter-packing pressure $P_{packing}$ of the inter-packing volume 142 will not reach the upstream pressure P1 due to leakage in excess of the downstream pressure P2 flowing out the external flow path 190. Thus, in some embodiments, the labyrinth seal or first packing arrangement 138 having the first leakage rate enables both the first packing arrangement 138 to operate at a lower sealing stress and the second packing arrangement 140 to operate at a lower packing stress, thereby further reducing friction between the sliding stem 106 and the packing system 132. In some embodiments, the first, second, and third rings 144, 146, 148 of the first packing arrangement 138 can be configured to provide the labyrinth seal or first leakage rate. In such embodiments, the first, second, and third rings 144, 146, 148 of the first packing arrangement 138 can be configured to collectively have a first leakage rate that is different (e.g., greater) than a second leakage rate of the first and second rings 150, 152 collectively (i.e., the second packing arrangement 140).

With continued reference to FIGS. 1 and 2, a check valve (not shown) may be arranged along the external flow path 190 or within the bore port 176 to counteract operating conditions of the valve assembly 100 in which the downstream pressure P2 may equal or exceed the upstream pressure P1, such as, for example, when the control valve 100 is fully opened while an isolation valve downstream of the outlet 118 of the control valve 100 is closed. In such operating conditions, the check valve can be configured such that the upstream pressure P1 continues to act on the packing system 132 instead of the downstream pressure P2. Further, as the pressure builds between the labyrinth seal or the first packing arrangement 138 having the first leakage rate and the sliding stem 106, the pressure drop across the labyrinth seal decays and reduces the amount of flow through the labyrinth seal while slowing the rate of increase of the inter-packing pressure $P_{packing}$. Thus, the combination of the check valve and the labyrinth seal can shield the packing system 132 from the full downstream pressure P1 for an extended period of time.

A variety of other configurations of the valve assembly 100 are possible to facilitate the benefits of the valve assembly 100 having the packing system 132 as discussed above. As also noted above with reference to FIG. 1, for example, a second outlet port 178' can be included in the valve assembly 100 instead of (or in addition to) the outlet port 178. For example, the second outlet port 178' can extend through a wall of the valve body 104 and open into the outlet 118 or into the valve flow passage 114 downstream of the control member 120. In this configuration, the second outlet port 178' can provide fluid communication between the inter-packing volume 142 of the bore 108 and the outlet volume 186 similar to the outlet port 178, via the external flow path 190. In some embodiments, the second outlet port 178' can extend through a different wall and open into another volume downstream of the valve seat 124 (e.g., a connecting pipe (not shown) arranged at the outlet 118 providing fluid communication with other downstream components).

In some embodiments, the inter-packing volume 142 of the bore 108 can be in fluid communication with the outlet volume 186 via each of the outlet port 178 and the second outlet port 178' (see FIG. 1) that are together arranged along the external flow path 190. In some embodiments, the valve assembly 100 can include a second bore port 176' (not shown) in addition to the bore port 176. In such embodiments, the bore port 176 can be in fluid communication with a first outlet port (e.g., the outlet port 178) and the second bore port 176' (not shown) can be in fluid communication a second outlet port (e.g., the second outlet port 178'). Additional example configurations implemented in other example valve assemblies will be described in greater detail below with reference to FIGS. 3-5.

Figure 3:
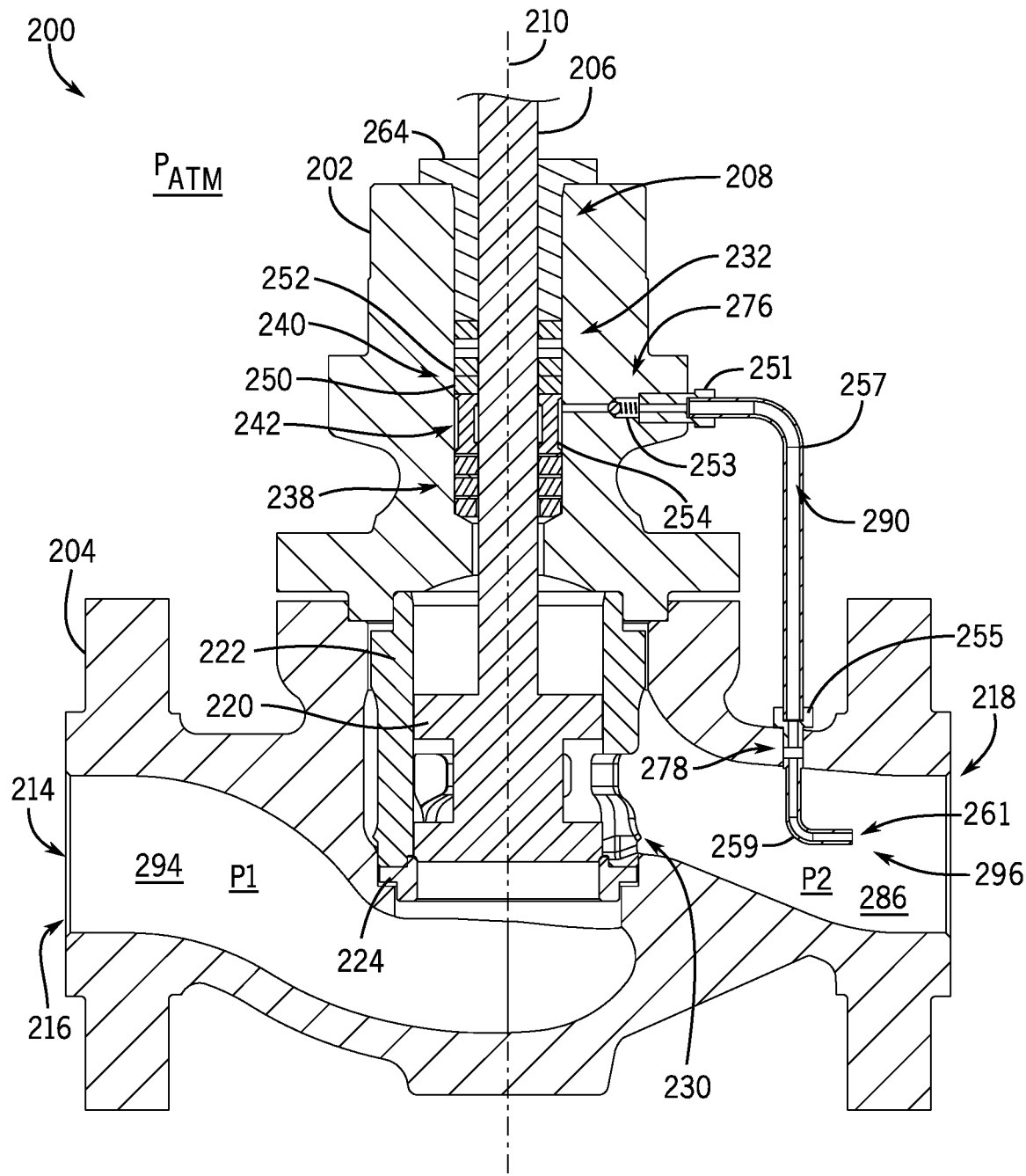
FIGS. 3-5 are cross-sectional views of other embodiments of a valve assembly constructed in accordance with principles of the present disclosure.
Figure 4:
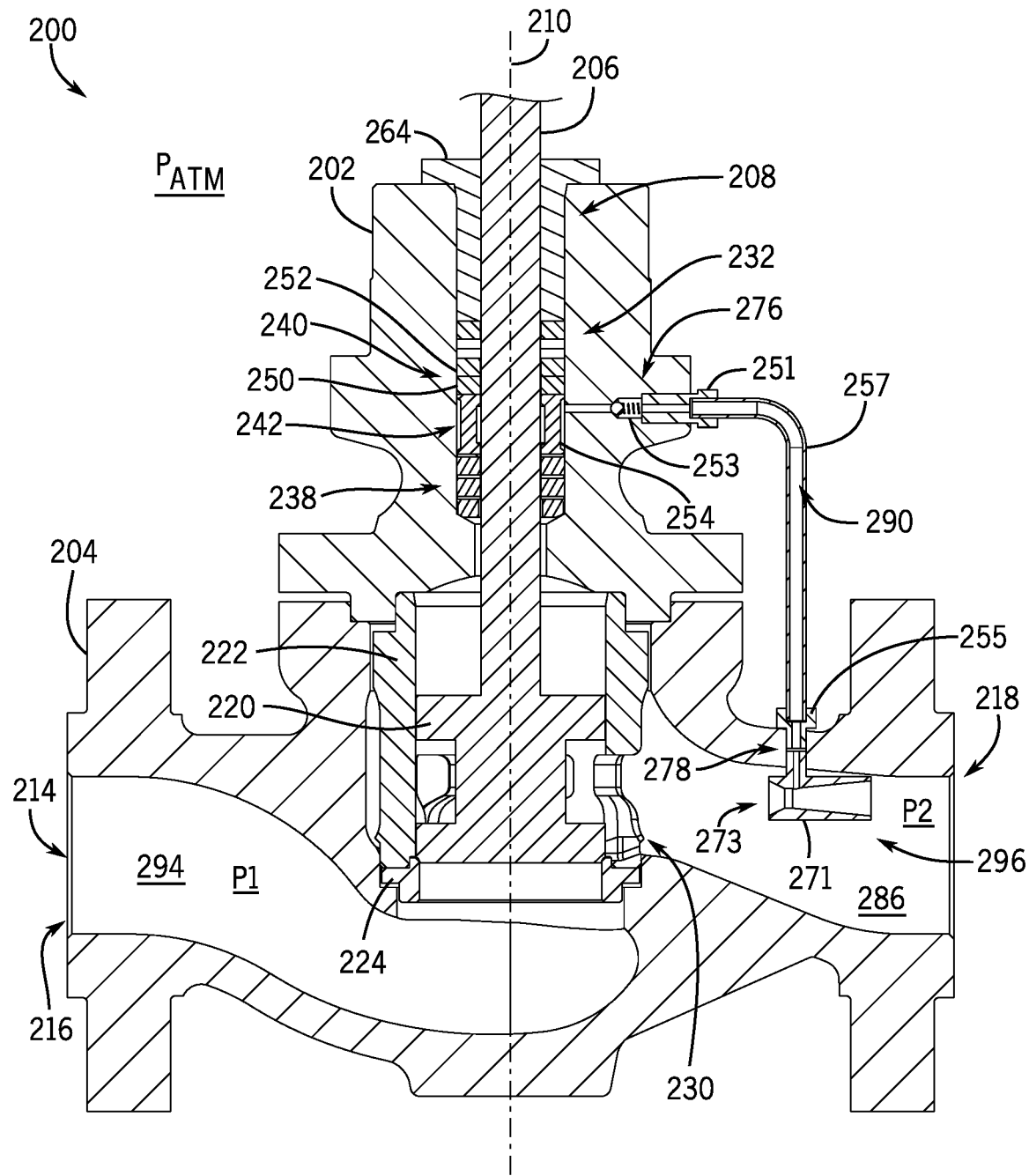
Figure 5:
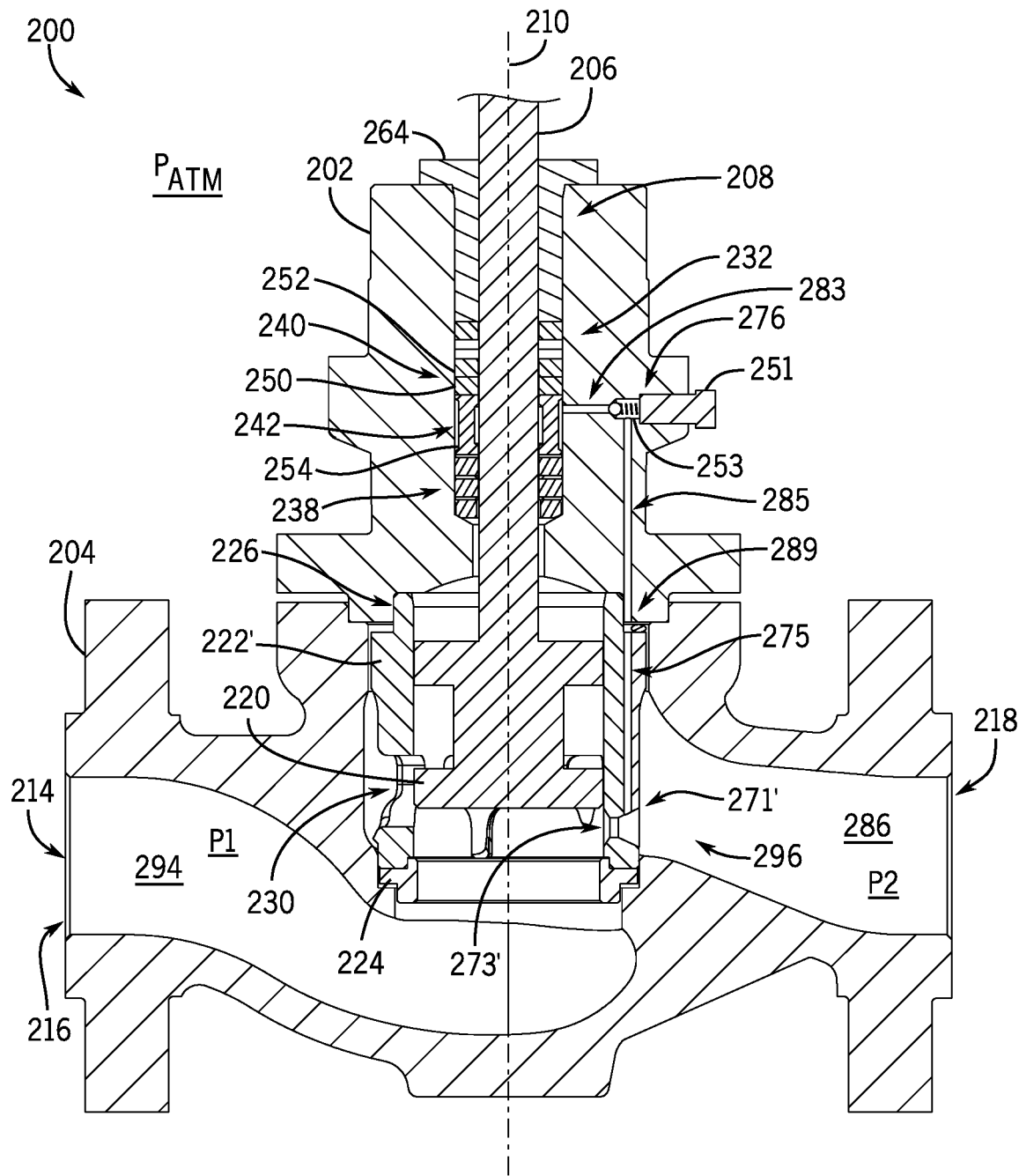

Referring now to FIGS. 3-5, another example embodiment of a valve assembly 200 is depicted, which includes a bonnet 202 mounted on a valve body 204. The valve assembly 200 is similar to the previously discussed example valve assembly 100, with like elements being indicated by similar reference numerals under the "200 series" of reference numerals. While the valve assembly 200 is similar to the previously discussed embodiment valve assembly 100 in many aspects, there are some aspects that differ. For example, similarly to the valve assembly 100, the valve assembly 200 is a cage-guided control valve with a "flow up" configuration. As such, the valve assembly 200 includes a cage 222, and a sliding stem 206 to guide the control member 220 between the open position (as shown in FIG. 5) and the closed position (as shown in FIGS. 3 and 4). In contrast to the valve assembly 100, however, the valve assembly 200 includes a vacuum source 296 that is configured to reduce the inter-packing pressure $P_{packing}$ within the inter-packing volume 242 to at or below the downstream pressure P2 (e.g., at an outlet 218 of the valve body 204), when the valve assembly 200 is in the open position and process fluid flows through the valve flow passage 214. In other words, the vacuum source 296 of the valve assembly 200 is configured to reduce the inter-packing pressure $P_{packing}$ to less than the downstream pressure P2, which can provide similar benefits as are discussed for the embodiment of FIGS. 1 and 2.

In some embodiments, the vacuum source 296 can be configured to reduce the inter-packing pressure $P_{packing}$ below an atmospheric pressure $P_{atm}$ by a percentage in a range of about 50% to about 99%, in a range of about 55% to about 95%, in a range of about 60% to about 90%, or in a range of about 65% to about 85%. In some embodiments, the vacuum source 296 can be configured to reduce the inter-packing pressure $P_{packing}$ to a percentage of the atmospheric pressure $P_{atm}$ in a range of about 5% to about 99%, in a range of about 15% to about 85%, in a range of about 25% to about 75%, or in a range of about 35% to about 60%.

Referring to FIGS. 3 and 4, and as described above, the valve assembly 200 is a cage-guided control valve having the cage 222 that includes a plurality of T-shaped windows 230. The windows 230 of the cage 222 are configured to throttle flow through the valve flow passage 214 by varying the flow area through the cage 222 depending on the position of the control member 220 that may cover portions of the windows 230, depending on its linear position along axis 210. In such valve assemblies, the flow characteristics of the valve assembly may be altered by replacing the cage with an alternative cage having windows with different sizes or profiles. Accordingly, particular cage configurations illustrated herein are not intended to limit the scope of alternatives. Some embodiments as presented herein, including as shown in FIGS. 1-4 can be readily applied with any variety of known cage configurations.

Referring still to FIGS. 3 and 4, a first fitting 251 and a check valve 253 are arranged within the bore port 276. A tube 257 extends from the first fitting 251 of the bore port 276 to a second fitting 255 arranged within the outlet port 278 to provide fluid communication between the bore port 276 and the outlet port 278. Thus, the tube 257 provides fluid communication between the inter-packing volume 242 within the bore 208 of the bonnet 202 and the outlet volume 286 of the outlet 218 of the valve body 204 along the external flow path 290 within the tube 257.

Referring specifically to FIG. 3, one example configuration of the vacuum source 296 of the valve assembly 200 is depicted. In the illustrated embodiment of FIG. 3, the vacuum source 296 of the valve assembly 200 is a pitot tube 259 in communication with the outlet port 278. In particular, an open end 261 of the pitot tube 259 is oriented to open in a downstream direction relative to flow through the valve assembly 200. As a result, the dynamics of fluid flow around the pitot tube 259 will create a reduced pressure area at the open end 261, which will tend to draw flow along the tube 257 from the inter-packing volume 242, and thereby reduce the inter-packing pressure $P_{packing}$ (e.g., to substantially below the downstream pressure P2).

Referring specifically to FIG. 4, another exemplary embodiment of the vacuum source 296 of the valve assembly 200 is depicted. In the illustrated embodiment of FIG. 4, the vacuum source 296 is a venturi body 271 in communication with the outlet port 278. In particular, a venturi passage 273 of the body 271 is oriented along a flow path through an outlet volume 286 of the valve assembly 200, to provide a reduced pressure at the outlet port 278 in response to flow across the valve seat 224. Accordingly, during operational flow through the valve assembly 200, fluid flow through the venturi body 271 will create a reduced pressure area at the outlet port 278, which will tend to draw flow along the tube 257 from the inter-packing volume 242, and thereby reduce the inter-packing pressure $P_{packing}$ (e.g., to substantially below the downstream pressure P2).

In some embodiments, a vacuum source, including a pitot tube or venturi body (e.g., the pitot tube 259 in FIG. 3, or the venturi body 271 in FIG. 4) can be integrally formed on a valve body downstream of a valve seat. In some embodiments, an external flow path can similarly be integrally formed within a valve body, including as described with reference to FIGS. 1 and 2, or through similar modifications of components of the valve assembly 200. Thus, in such embodiments, a valve assembly can include a fully integrated packing system having a vacuum source without any additional components or flow paths external to the valve assembly.

In some embodiments, a vacuum source and an inter-packing flow passage can be formed to be fully internal to an envelope of a valve assembly (e.g., fully internal to an envelope of a bonnet and valve body). For example, in the example configuration illustrated in FIG. 5, the vacuum source 296 is formed as a venturi body 271' that is integrally formed with a cage 222' and the external flow path 290 of the example configurations of valve assembly 200 as discussed with reference to FIGS. 3 and 4 is integrally formed with, and fully internal to the cage 222' and the bonnet 202 of the valve assembly 200.

With continued reference to FIG. 5, the bore port 276 extends into the exterior of an upper portion of the bonnet 202 and includes a first passageway 283 and a second passageway 285. The first passageway 283 extends between the bore 208 and the bore port 276. One end of the first passageway 283 opens into the inter-packing volume 242 within the bore 208, and the other end of the first passageway 283 opens into an interior volume of the bore port 276. The end of the first passageway 283 opening into the inter-packing volume 242 may be positioned, in the direction of central axis 210, between the first packing arrangement 238 and the second packing arrangement 240. Additionally, the first passageway 283 of the bore port 276 may be aligned with a middle portion of the lantern ring 254 such that the first passageway 283 communicates directly with an annular gap defined by the middle portion of the lantern ring 254. The second passageway 285 of the bore port 276 extends from the interior volume of the bore port 276 perpendicular to the first passageway 283 and axially through the bonnet 202 toward the valve body 204. One end of the second passageway 285 opens into the interior volume of the bore port 276, and the other end of the second passageway 285 extends adjacent to the guide 226 and through a bottom surface of the bonnet 202 such that it opens into a gap 289 at an interface between the valve body 204 and the bonnet 202, which is defined by a bottom surface of the bonnet 202 and partially by an upper surface of the cage 222' and partially by an opening of the valve body 204.

Referring still to FIG. 5, and as discussed above, the venturi body 271' is integrally formed with the cage 222' of the valve assembly 200 and can be arranged between two of the windows 230 of the cage 222'. The venturi passage 273' extends through an inner surface to an outer surface of the cage 222' and is oriented such that it is aligned with the flow path through the valve flow passage 214 from the inlet 216 to the outlet 218. A vacuum source passageway 275 extends between the inner and outer surfaces of the cage 222' from the venturi body 271' toward the bonnet 202 and through the upper surface of the cage 222' such that it opens into the gap 289. In the illustrated embodiment, the vacuum source passageway 275 of the cage 222' is configured to align with, and be in fluid communication with, the second passageway 285 of the bore port 276.

In some embodiments, a sealing structure, such as, for example, two or more gaskets, may be disposed within the gap 289 that is configured to provide a uniform annular flow path through the gap 289 between the vacuum source passageway 275 of the cage 222' and the second passageway 285 of the bore port 276 or to provide a seal at the interface between the valve body 204 and the bonnet 202.

With continued reference to FIG. 5, the inter-packing volume 242 of the bore 208 is in fluid communication with the outlet 218 of the valve assembly 200 via the first and second passageways 283, 285 of the bore port 276 and the vacuum source passageway 275 of the cage 222'. When the control member 220 is in the open position (as shown in FIG. 5), at least a portion of the process fluid flowing along the valve flow passage 214 from the inlet 216 flows through the venturi passage 273' of the venturi body 271' integrally formed in the cage 222' to the outlet 218 of the valve assembly 200. Thus, similar to the venturi body 271 in the example configuration of the valve assembly 200 discussed with reference to FIG. 4, the venturi body 271' integrally formed with the cage 222' in FIG. 5 is configured to depressurize the inter-packing volume 242 of the bore 208 such that the inter-packing pressure $P_{packing}$ is significantly reduced within the inter-packing volume 242. When the control member 220 is in the closed position (as shown in FIGS. 3 and 4), the control member 220 is configured to cover or block the venturi passageway 273' of the integrally formed venturi body 271' while contacting the valve seat 224.

As discussed with reference to FIGS. 3-5, the valve assembly 200 is generally configured such that the vacuum source 296, such as, for example, the pitot tube 259 in FIG. 3 or the venturi bodies 271, 271' in FIGS. 4 and 5, reduces the inter-packing pressure $P_{packing}$ within the inter-packing volume 242 during operation of the valve assembly 200 in the open position (as shown in FIG. 5), with corresponding benefits for packing performance, including as detailed above. When the valve assembly 200 is moved to the closed position (as shown in FIGS. 3 and 4), the check valve 253 arranged in the bore port 276 can be configured to maintain the reduced pressure within the inter-packing volume 242 by not permitting flow from the outlet volume 286 to the inter-packing volume 242, even if pressure at the outlet volume 286 were to increase due to downstream effects. Further, if the valve assembly 200 remains in the closed position for an extended period of time and upstream pressure P1 leaks through the first packing arrangement 238 of the packing system 232 to substantially raise the inter-packing pressure, the check valve 253 can operate to release the inter-packing pressure to the outlet volume 286.

As such, in some embodiments, the valve assembly 200 can further include one or more features that are configured to maintain or prolong the reduced pressure within the inter-packing volume 242 when the valve assembly 200 is in the closed position for an extended period of time. For example, in some embodiments, the valve assembly 200 may include an auxiliary chamber (not shown) arranged in the bore 208 of the bonnet 202 adjacent to, and in fluid communication with, the inter-packing volume 242. As such, the auxiliary chamber can be configured to increase the volume of the inter-packing volume 242 and thus, can prolong the amount of time the inter-packing volume 242 increases in pressure with the valve assembly 200 in the closed position. Further, the auxiliary chamber can permit increased leakage from the first packing arrangement 238 rather than from the second packing arrangement 240 (which results in fugitive emissions from the valve assembly) while the inter-packing volume 242 gradually increases in pressure over the extended period of time.

In some embodiments, the valve assembly 200 may include an external vacuum source that is configured to maintain the reduced pressure within the inter-packing volume 242 when the valve assembly 200 in the closed position for an extended period of time. For example, in some embodiments, the external vacuum source can be a pump (not shown) that is in fluid communication with the inter-packing volume 242 and the outlet volume 286 of the outlet 218 of the valve body 204. In some embodiments, the pump can be arranged along the external flow path 290, such as, for example, along the tube 257 or at the bore port 276. In some embodiments, the pump can be a fluid-driven pump, such as, for example, a compressed air-driven liquid pump. In other embodiments, the pump can be driven by a power source external to the valve assembly 200.

Referring still to FIGS. 3-5, in some embodiments, the packing system 232 of the valve assembly 200 can be configured to include a first packing arrangement 238 with a first leakage rate that is greater than a second leakage rate of the second packing arrangement 240, similar to the packing system 132 of the valve assembly 100 as discussed with reference to FIGS. 1 and 2. Further, in some embodiments, the first packing arrangement 238 of the packing system 232 can be configured as a labyrinth seal, similar to the first packing arrangement 138 of the valve assembly 100 as discussed with reference to FIGS. 1 and 2. In some embodiments, the first and second rings 250, 252 of the second packing arrangement 240 of the packing system 232 may be V-rings having a first end that is flat and a second end opposite the first end that has an annular indentation. In such embodiments, the first and second V-rings 250, 252 of the second packing arrangement may be arranged such that the second ends of the V-rings 250, 252 each face toward a packing follower 264.

In addition to generally providing increased performance and lifespan of the packing system of a valve assembly, including as discussed above with reference to FIGS. 1-5, embodiments of the present disclosure can facilitate improved monitoring of valve assemblies, including to determine the current sealing effectiveness of a packing system and pre-emptively identify potential failures of the packing system. In some embodiments, arrangements disclosed herein can allow the sealing effectiveness of a packing system to be tracked over an extended period, including to help predict when the packing system may fail and to proactively service or replace the packing system. Some example configurations of monitoring systems, and corresponding monitoring methods, will be described in greater detail below with reference to FIGS. 6-9.

Referring now to FIGS. 6-9, various example configurations of a diagnostics system 300 the packing system 132 of the valve assembly 100 are depicted. While the various example configurations of the diagnostic system 300 in FIGS. 6-9 are described with reference to the valve assembly 100 of FIGS. 1 and 2, the following example configurations of the diagnostic system 300 can be included in other valve assemblies, including valve assembly 200 of FIGS. 3-5.

Figure 6:
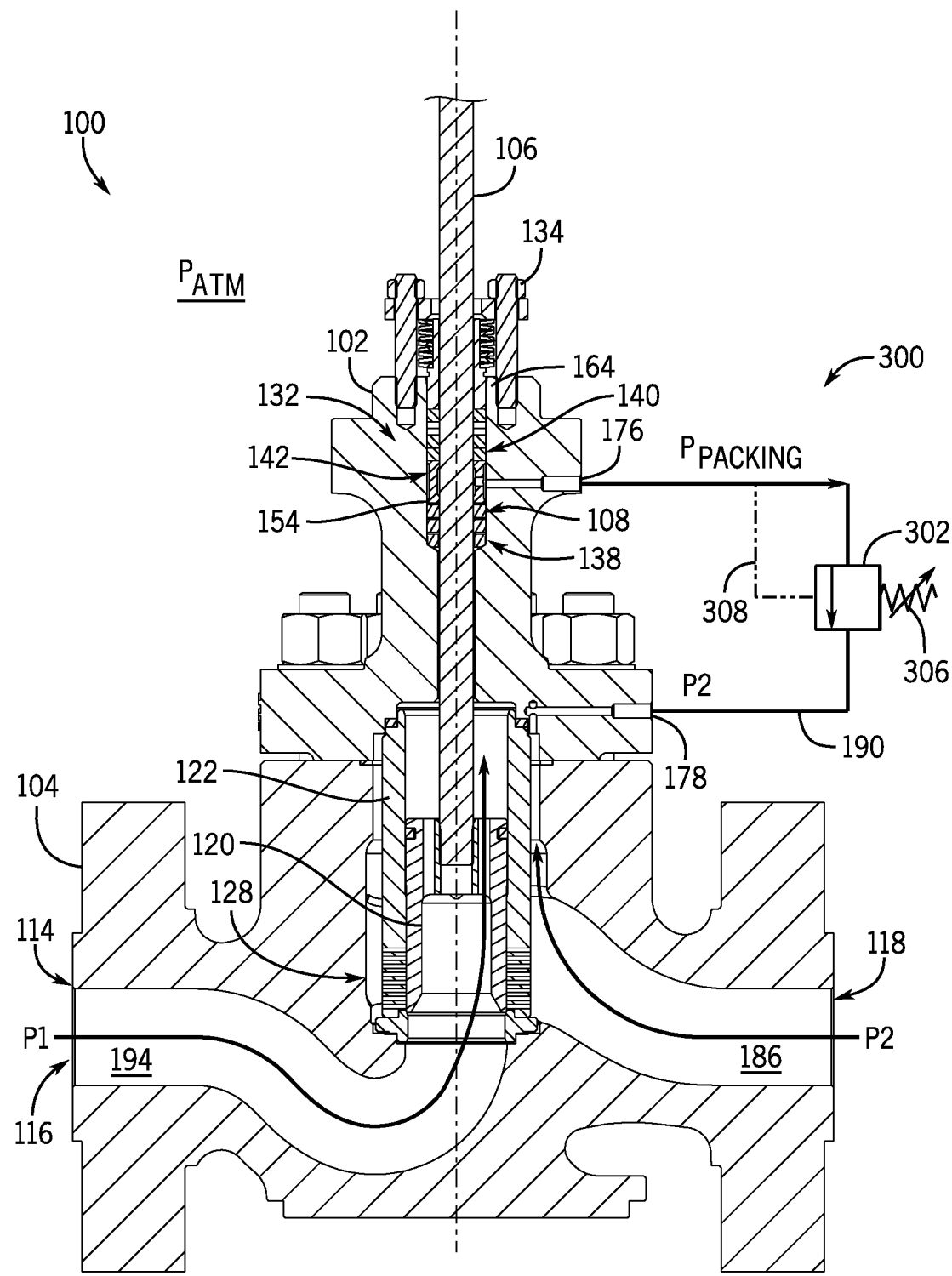
FIGS. 6-9 are cross-sectional partly schematic views of the valve assembly of FIG. 1 configured for various diagnostic (or other monitoring) operations.

Referring specifically to FIG. 6, the diagnostic system 300 of the packing system 132 of the valve assembly 100 includes an adjustable pressure relief valve 302 disposed in the external flow path 190 between the bore port 176 and the outlet port 178. In the illustrated embodiment, the adjustable pressure relief valve 302, in a variety of generally known configuration, can define a set (i.e., minimally required) pressure for flow between the bore port 176 and the outlet 118 of the valve assembly 100. In particular, the pressure relief valve 302 is shown in FIG. 6 as being operated by a pressure signal at pilot line 308, and with an adjustable bias spring 306. However, various known configurations for pressure relief valves can be used in other embodiments.

With continued reference to FIG. 6, when the inter-packing pressure $P_{packing}$ of the packing system 132 increases to the set point of the pressure relief valve 302, the pilot line 308 causes the pressure relief valve 302 to open and additional leakage from the packing system 132 is permitted to flow downstream to outlet 118 of the valve assembly 100 via the outlet port 178 until the inter-packing pressure $P_{packing}$ decreases to (or below) the set point of the pressure relief valve 302. Thus, the pressure relief valve 302 can be configured to prevent the packing system 132 from being over-pressured by setting the set point of the pressure relief valve 302 to correspond to (e.g., equal) a desired maximum inter-packing pressure $P_{packing}$.

In some cases, the configuration of FIG. 6 may be particularly beneficial if a pressure rating of the packing system 132 as a whole is higher than an inlet pressure or upstream pressure rating of the valve assembly 100, even though at least one of the first and second packing arrangements 138, 140 may individually have a lower pressure rating than the inlet pressure. In addition, pressure applied to the packing system 132, i.e., the inter-packing pressure $P_{packing}$, can be adjusted at any point in the lifecycle of the packing system 132 by adjusting the set point of the pressure relief valve 302. This adjustability of the pressure relief valve 302 of the diagnostic system 300 may be particularly beneficial when the packing system 132 needs repaired as both the axial force on the packing system 132 (via the packing nuts 134) and the inter-packing pressure $P_{packing}$ (via the pressure relief valve 302) can be adjusted simultaneously.

Referring still to FIG. 6, the pressure relief valve 302 may also be utilized in diagnosing or evaluating the sealing performance or health of at least the first packing arrangement 138 of the packing system 132, including by monitoring relief events at the valve 302. For example, when the set point of the pressure relief valve 302 is set below the upstream pressure P1 and the inter-packing pressure $P_{packing}$ fails to reach the set point of the pressure relief valve 302, the lack of relief events at the valve 302 may be indicative that the packing system 132 is healthy, because a leakage rate of the first packing arrangement 138 is below an acceptable maximum leakage rate value. However, if the set point of the pressure relief valve 302 is set below the upstream pressure P1 and the inter-packing pressure $P_{packing}$ reaches the set point of the pressure relief valve 302 (e.g., within a particular amount of time), the relief event(s) at the valve 302 may be indicative that the packing system 132 should be serviced or replaced, including because the leakage rate of the first packing arrangement 138 of the packing system 132 may exceed a maximum leakage rate value. Similarly, occurrence or non-occurrence of relief events at the valve 302 may be indicative of whether the first and second packing arrangements 138, 140 of the packing system 132 are properly loaded.

Figure 7:
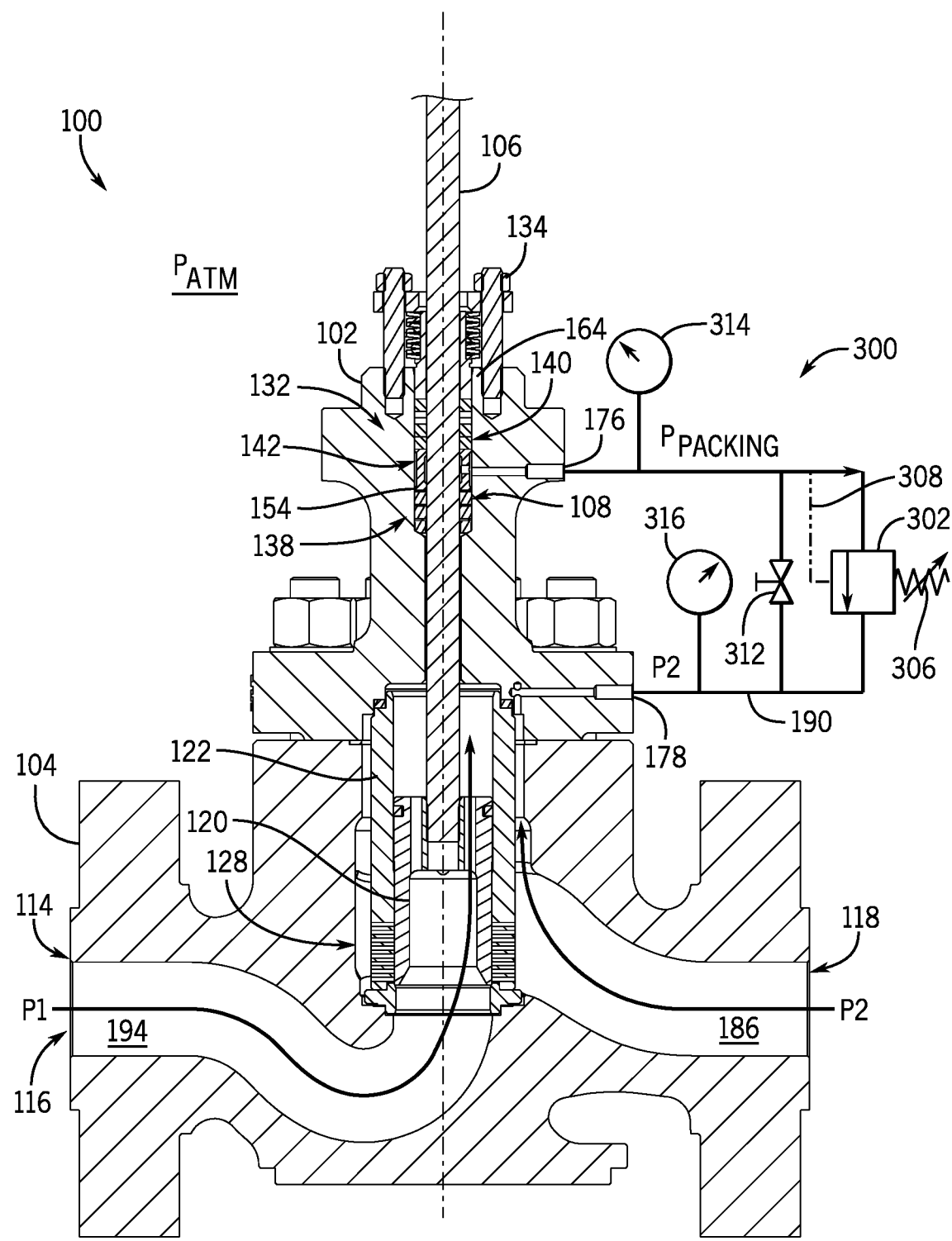

In some embodiments, other features in a diagnostic system can be used to further monitor the packing system 132 relative to sealing performance or health of the packing system 132 (or at least one of the first and second packing arrangements 138, 140 of the packing system 132). Referring specifically to FIG. 7, for example, the diagnostic system 300 of the packing system 132 of the valve assembly 100 may further include a block valve 312 arranged in parallel with the pressure relief valve 302 along the external flow path 190, a first pressure gauge 314 arranged along the external flow path 190 between the bore port 176 and the block valve 312, and a second pressure gauge 316 arranged along the external flow path 190 between the outlet port 178 and the block valve 312. The first pressure gauge 314 is thus configured to measure the inter-packing pressure $P_{packing}$, and the second pressure gauge 316 is thus configured to measure the downstream pressure P2 at the outlet port 178 (e.g., as equal to the outlet pressure for the valve assembly 100 as a whole, for the configuration shown). The block valve 312 is configured such that flow along the external flow path 190 bypasses the pilot line 308 and the pressure relief valve 302 when the block valve 312 is opened.

With the block valve 312 allowing selective control of fluid communication between the inter-packing volume 142 and the outlet volume 186, the pressure gauges 314, 316 can be used in combination to evaluate leakage rates or other operational factors for the packing system 132 (and in particular for the first packing arrangement 138). For example, in the example configuration of the diagnostic system 300 in FIG. 7, when the valve assembly 100 and the pressure relief valves 302 are closed, opening the block valve 312 will cause the inter-packing pressure $P_{packing}$, as measured at the first gauge 314, to decay to the downstream pressure P2, as measured at the second gauge 316. Once the block valve 312 is closed, increase of the inter-packing pressure $P_{packing}$ beyond the downstream pressure P2 can be monitored using the first gauge 314, and the first packing arrangement 138 of the packing system 132 evaluated accordingly.

In some implementations, an average rate of change (e.g., increase) of the inter-packing pressure $P_{packing}$ can be determined. For example, an average rate of increase of the inter-packing pressure $P_{packing}$ can be determined over an evaluation time period. With an average (or other) rate of change of the inter-packing pressure $P_{packing}$ determined, an average (or other) mass flow rate of leakage through the first packing arrangement 138 (i.e., a first mass flow rate or a first leakage rate) into the inter-packing volume 142 of the packing system 132 can then be determined, as appropriate. For example, a mass flow rate of leakage through the first packing arrangement 138 can be determined based on the average rate of increase of the inter-packing pressure in relation to the differential pressure (i.e., the difference between the upstream pressure P1 and the atmospheric pressure $P_{atm}$). In some implementations, the mass flow rate of leakage through the first packing arrangement 138 can be determined using a mass flow rate sensor or other known determination means. Thus, for example, a mass flow rate of leakage (i.e., a leakage rate) of the first packing arrangement 138 (or other related flow factors) can be determined periodically to track the increase of the leakage rate of the first packing arrangement 138 throughout the lifecycle of the packing system 132. In some cases, by helping to identify when the leakage rate of the first packing arrangement 138 increases to a predetermined maximum value, the diagnostic system 300 may provide indications that the packing stress of the packing system 132 needs to be increased, or that the packing system 132 needs to be otherwise serviced (e.g., replaced).

Figure 8:
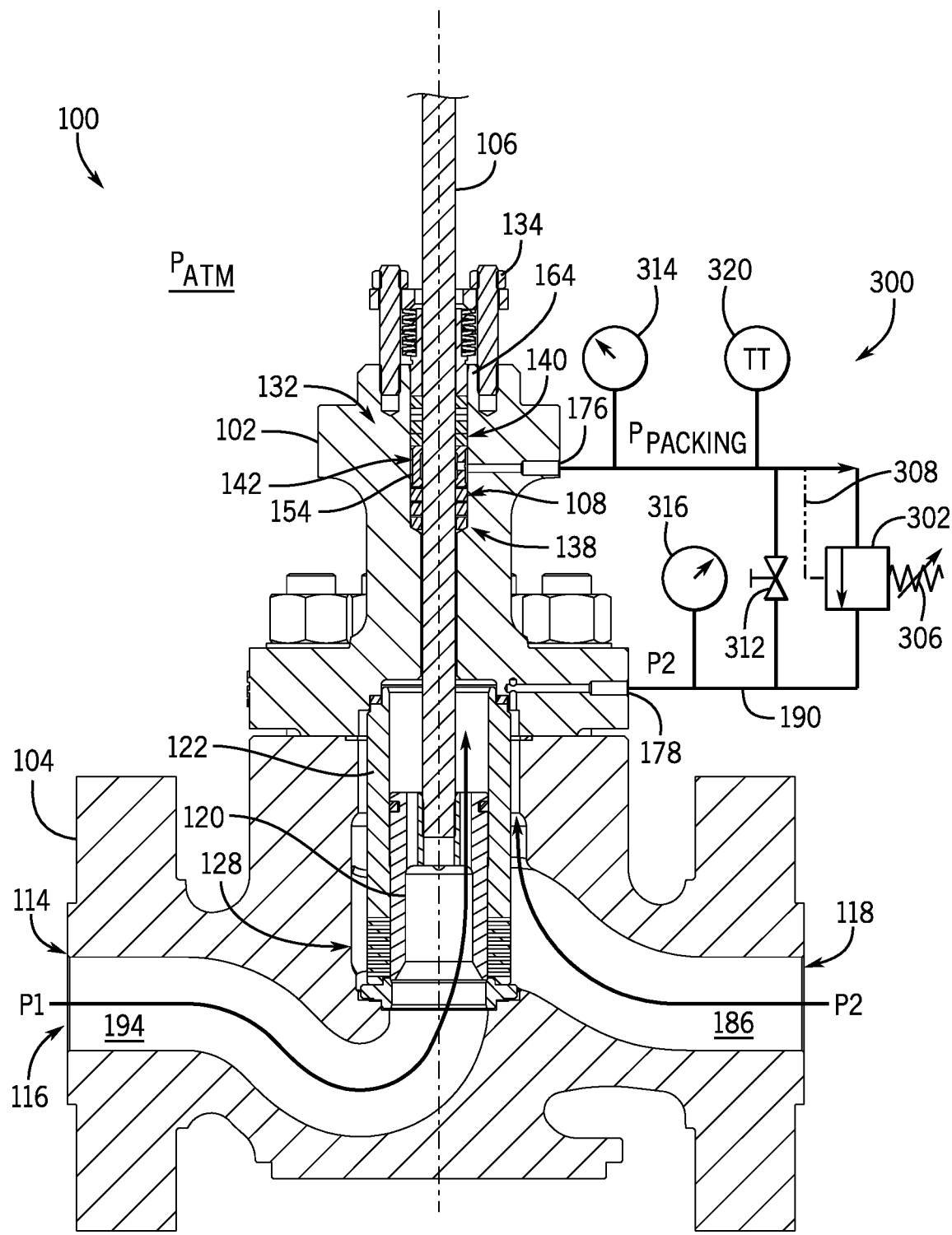

In some cases, temperature measurements along an inter-packing flow path can also provide useful diagnostic information. Referring specifically to FIG. 8, the diagnostic system 300 may be further configured to proactively identify potential leakage across the first packing arrangement 138 of the packing system 132. In particular, in the illustrated configuration, the diagnostic system 300 further includes a temperature gauge or transmitter 320 arranged along the external flow path 190 upstream of the block valve 312. During operation, the temperature transmitter 320 can thus determine a temperature that corresponds to the inter-packing volume 142 of the packing system 132, as well as changes in the temperature (and changes in the rate of change of the temperature), as can be analyzed to identify leakage (e.g., due to increased temperature from leaking high-temperature process fluid) and changes in leakage (e.g., due to increased rates of temperature change relative to reference values or conditions). In some embodiments, one or more other temperature transmitters can measure other temperatures (e.g., of reference fluid at the inlet 116) to provide reference values or other relevant data for evaluating temperature signals from the temperature transmitter 320.

In some embodiments, the diagnostic system 300 can be configured to provide audio, visual, or electronic alerts (e.g., when a temperature or rate of temperature change at the temperature transmitter 320 exceeds a threshold value). In some embodiments, the diagnostic system 300 can be configured to provide audio, visual, or electronic alerts based on measured values for the inter-packing volume 142 or the inter-packing flow path (e.g., when the temperature or rate of temperature increase of the inter-packing volume 142 reaches a predetermined threshold). In some embodiments, including as discussed in greater detail below, the diagnostic system 300 can further include a controller that is configured to receive signals from the temperature transmitter 320 and other sensors or transmitters included in the diagnostic system 300, including to analyze recorded operational data, provide alerts, or implement remedial control actions.

Figure 9:
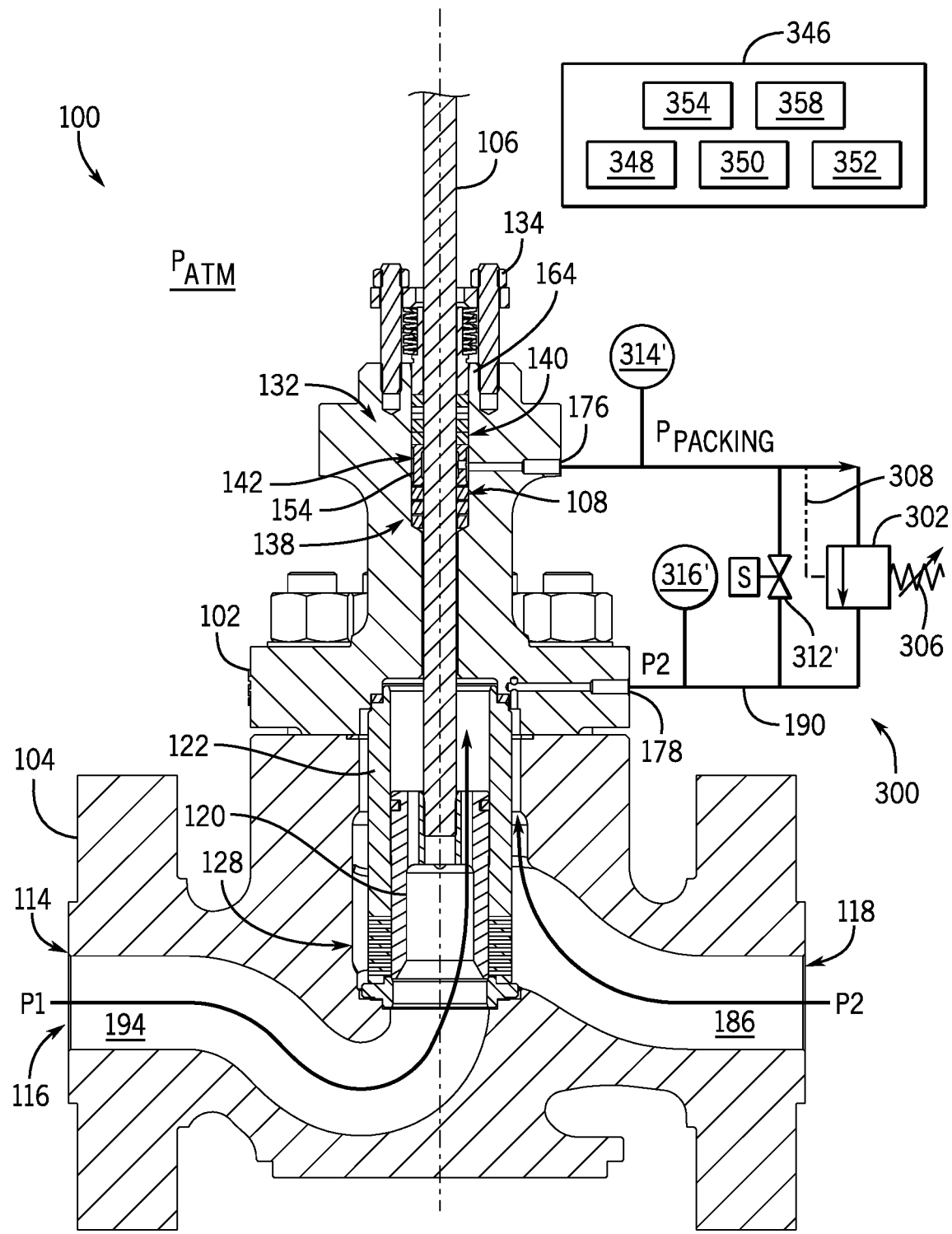

Referring specifically to FIG. 9, the determination and tracking of the leakage rate of the first packing arrangement 138 (e.g., as described with reference to FIG. 7) or the determination of the temperature of the inter-packing volume 142 (e.g., as described with reference to FIG. 8) can be automated or determined remotely from the valve assembly 100. For example, as shown in FIG. 9, the diagnostic system 300 includes the pressure relief valve 302, a solenoid-operated block valve 312', a first sensor 314', and a second sensor 316' arranged along the external flow path 190 in a similar arrangement as the pressure relief valve 302, the block valve 312, the first pressure gauge 314, and the second pressure gauge 316, respectively, of the exemplary diagnostic system 300 described with reference to FIG. 7. Additionally, the exemplary diagnostic system 300 of FIG. 9 further includes a control unit 346 (e.g., an electronic or other logic device configured to receive and transmit data with external sensors and processor devices, including external sensors, remote computing systems, etc.).

To control operation of relevant components of the diagnostic system 300, a controller such as the control unit 346 may include various known electrical, hydraulic, and other modules, including special or general purpose computing devices, and so on. In this regard, for example, the control unit 346 may include a processor 348, a memory 350, an input/output circuit 352 that facilitates communication internal and external to the control unit 346, and an operator interface 354. The processor 348 may control operation of the control unit 346 by executing operating instructions, such as, for example, computer readable program code stored in the memory 350, wherein operations may be initiated internally or externally to the control unit 346. The memory 350 may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the control unit 346. Although a single control unit 346 is described, it will be appreciated that some diagnostic systems can include a different number of control units, including control units that are distributed about the valve assembly or located remotely from the valve assembly. Further, although expressly illustrated in the context of FIG. 9, the control unit 346 (or other units) can be readily utilized with other valves described herein, with suitable substitutions as needed (e.g., of suitable pressure transducers for gauges).

In the example embodiment illustrated in FIG. 9, the control unit 346 is in electrical, hydraulic, or other communication with the block valve 312', the first sensor 314', and the second sensor 316'. Correspondingly, the block valve 312' may be configured as an electromechanical valve, such as the exemplary solenoid-operated block valve 312' of FIG. 9, a hydraulically actuated pilot valve, or in various other known ways. As appropriate, the control unit 346 can receive signals from or send signals to the block valve 312'. For example, the control unit 346 can send signals over a controller area network ("CAN") bus or other known communication architecture to energize or deenergize the solenoid of the block valve 312' and any other number of electromechanical devices. Further, in some embodiments, the pressure relief valve 302 can also be an electromechanical valve, such as a hydraulically actuated pilot valve or in various other known ways. In such embodiments, the control unit 346 may receive signals from or send signals to the pressure relief valve 302.

With continued reference to the illustrated embodiment of FIG. 9, the control unit 346 can also receive signals from or send signals to the operator interface 354. The operator interface 354 can embody many different forms or can include many different components. For example, the operator interface 354 can be or include a graphical user interface ("GUI"), an actuatable button, or other typical components used in the art. The control unit 346 can receive signals from the operator interface 354, which can include for example, signals corresponding to pressure values of the diagnostic system, an "on" or "off" state of an actuatable button, or a selection by an operator within the GUI.

In some embodiments, the control unit 346 can be in communication with other systems or components. In the illustrated embodiment of FIG. 9, the control unit 346 is also configured to receive signals from the sensors 314', 316' of various types that are distributed about the diagnostic system 300. For example, one or more of the sensors 314', 316' can be configured as a pressure sensor that can provide signals to the control unit 346 to support determination of a leakage rate of the first packing arrangement 138 of the packing system 132 of the valve assembly 100 (e.g., as described above) or other relevant operational parameters. As another example, one or more of the sensors 314', 316' can be configured as a temperature sensor that can provide signals to the control unit 346 to support determination of an increase in temperature within the external flow path 190.

As discussed above, during operation of the valve assembly 100 having the diagnostic system 300, the control unit 346 can use information gathered via the various illustrated (or other) communication channels to determine and track the health of the packing system 132 of the valve assembly 100. Thus, for example, the diagnostic system 300 may be configured to alert a user of a potential increase in the leakage rate of the packing system 132 (or in a leakage rate of at least the first packing arrangement 138 of the packing system 132), determine a leakage rate of the first packing arrangement 138 of the packing system 132, or track changes in the leakage rate of the first packing arrangement 138 of the packing system 132 at predetermined intervals, or at intervals in response to some other factor, over the lifecycle of the packing system 132. In the exemplary embodiment of FIG. 9, for example, the sensors 314', 316' can be pressure sensors that can be automatically operated by the control unit 346 for monitoring and diagnostics (e.g., in conjunction with the valve 312, to monitor the rate of increase of inter-packing pressure $P_{packing}$ as generally discussed above). In some embodiments, the periodically determined leakage rates of the first packing arrangement 138 can be stored in the memory 350, and the processor 348 can be further configured to enact particular operations when such leakage rate reaches a predetermined maximum value or other threshold condition. In some embodiments, the control unit 346 can be further configured to automatically alert a user once a determined leakage rate of the first packing arrangement 138 reaches or exceeds the predetermined maximum value via one or more indicators 358 that may be displayed on a GUI interface of the control unit 346, visual or audio indicators external to or arranged on the control unit 346 or the valve assembly 100, or communication with other remote devices. In some embodiments, one or more control units 346 can determine the leakage rates of a plurality of first packing arrangements 138 of a plurality of valve assemblies 100 having a diagnostic system 300. In some embodiments, a user can determine the leakage rate of the first packing arrangement 138 remotely via the control unit 346. In such embodiments, the control unit 346 may be configured to open or close the block valve 312' and to display pressure values received from the first and second sensors 314', 316' (e.g., first and second pressure transmitters) via the input/output circuit 352 and the operator interface 354 of the control unit 346.

With continued reference to FIG. 9, in some embodiments, one or more of the first and second sensors 314', 316' may be temperature sensors that are configured to determine a temperature within the external flow path 190. In some embodiments, the first and second sensors 314', 316' may include one or more pressure sensors along the external flow path 190 in addition to one or more temperature sensors.

While the valve assembly having a packing arrangement has been described in connection with a control valve having a flow up configuration, the scope of the present disclosure is not limited to this implementation. For example, the packing arrangement as described above may be implemented on a control valve having a "flow down" configuration, in which the packing system is exposed to the downstream pressure instead of the upstream pressure. For example, even if a packing arrangement is generally exposed only to downstream pressure during non-operation of a valve, a vacuum source (e.g., a venturi or pitot device) can still be arranged as generally discussed above, to provide inter-packing pressure that may still be reduced relative to outlet pressure. Correspondingly, for example, some embodiments can also provide improved packing arrangements for flow down valves.

While the valve assembly having a packing arrangement has been described in connection with control valves, the scope of the present disclosure is not limited to this implementation. A wide variety of devices that include a sealed movable operating member or shaft that provides a leakage path can be improved by the packing arrangement of the present disclosure.

In some implementations, devices or systems (e.g., a valve assembly or components of a valve assembly) disclosed herein can be utilized, manufactured, or installed using methods embodying aspects of the invention. Correspondingly, description herein of particular features, capabilities, or intended purposes of a device or system is generally intended to inherently include disclosure of a method of using such features for the intended purposes, a method of implementing such capabilities, a method of manufacturing relevant components of such a device or system (or the device or system as a whole), and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the invention, of the utilized features and implemented capabilities of such device or system.

Figure 10:
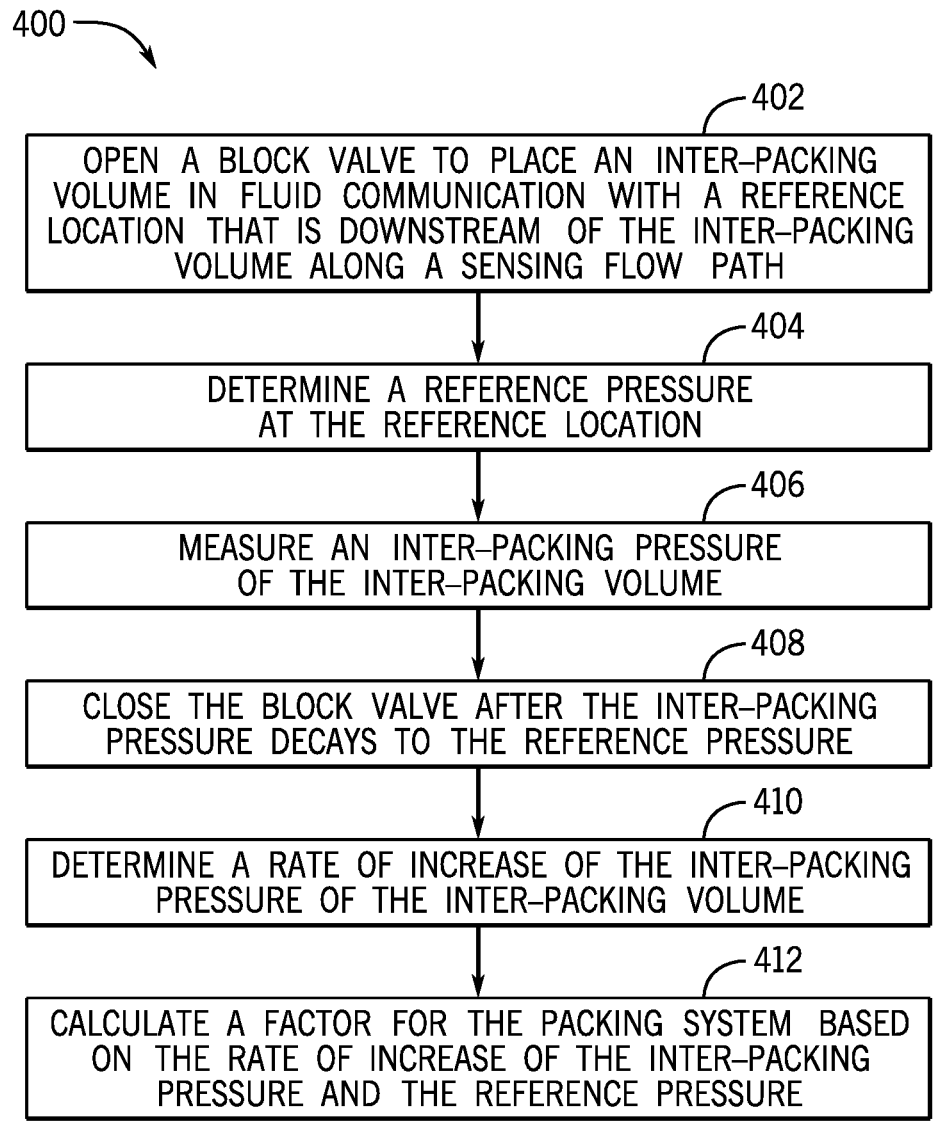
FIG. 10 is a flowchart illustrating a method of diagnostics for the valve assembly of FIG. 1.

In this regard, for example, FIG. 10 illustrates a method 400 of evaluating a seal provided by a packing system for a valve, with respect to an external flow path from the valve that extends between an area of system pressure for the valve and an exterior of the valve. By way of example, the method 400 will be described below with reference to the valve assembly 100 (see FIGS. 1 and 2) having the diagnostic system 300 (see FIGS. 6-9). However, other valve assemblies can be used (or constructed) according to other embodiments of the disclosed method.

In the illustrated example, operation 402 of method 400 includes opening a block valve, such as, for example, the block valve 312 of the exemplary diagnostic system 300 of FIG. 7, to place an inter-packing volume in fluid communication with a reference location, the reference location being downstream of the inter-packing volume along a sensing flow path. For example, the sensing flow path can be the external flow path 190 of the valve assembly 100 of FIGS. 1 and 2, and the reference location can be any point along the external flow path 190, including any point within the outlet volume 186 of the outlet 118 of the valve body 104 or the outlet volume 186 external to the valve assembly 100. Operation 404 of method 400 includes determining a reference pressure at the reference location, such as, for example, via the second pressure gauge 316 of the exemplary diagnostic system 300 of FIG. 7. Operation 406 of method 400 includes measuring an inter-packing pressure of the inter-packing volume, such as, for example, via the first pressure gauge 314 of the exemplary diagnostic system 300 of FIG. 7.

Operation 408 of method 400 includes closing the block valve (e.g., block valve 312) after the inter-packing pressure decays to the reference pressure. With the reference pressure determined and the inter-packing pressure measured, a rate of increase of the inter-packing pressure may be calculated based on the decay of inter-packing pressure after closing the block valve, such as, for example, the average rate of increase of the inter-packing pressure $P_{packing}$ discussed with reference to FIG. 7. In this regard, for example, operation 410 of method 400 can include determining a rate of increase of the inter-packing pressure of the inter-packing volume.

Using the determined reference pressure and the rate of increase of the inter-packing pressure, one or more factors for the packing system may be calculated. In this regard, for example, operation 412 of method 400 can include calculating a factor for the packing system based on the rate of increase of the inter-packing pressure and the reference pressure. In some embodiments, a factor for the packing system can be a leakage rate of a first or upstream packing arrangement of the packing system, such as, for example, the leakage rate of the of the first packing arrangement 138 (i.e., the mass flow rate of leakage through the first packing arrangement 138) of the packing system 132 discussed with reference to FIGS. 6-9. In such embodiments, the operation 408 of method 400 can further include measuring a time for the inter-packing pressure to decay to the reference pressure, such as, for example, measuring an evaluation time (i.e., a decay time), as discussed with reference to FIG. 7, with a start time being the time the block valve 312 is opened and an end time being the time the block valve 312 is closed after the inter-packing pressure $P_{packing}$ decays. Correspondingly, in such embodiments, the operation 410 can further include determining the average rate of increase of the inter-packing pressure using the decay time measured in operation 408. In other embodiments, another factor for the packing system can be based on a measured temperature of the inter-packing volume or the reference location.

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a control device such as a processor device, a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a control device such as an automation device, a special purpose or general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the Figures or otherwise discussed herein. Unless otherwise specified or limited, representation in the Figures of particular operations in particular spatial order may not necessarily require those operations to be executed in a particular sequence corresponding to the particular spatial order. Correspondingly, certain operations represented in the Figures, or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon, e.g., "at least one of") and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

As described herein, embodiments of the disclosed invention can provide a valve assembly having a packing system and a diagnostic method for a packing system of a valve assembly. The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A packing system for use with a valve including a valve body having an inlet, an outlet, and a flow passage extending between the inlet and the outlet, the packing system comprising:
   a bonnet configured for connection to the valve body;
   a bore extending through the bonnet and opening into the valve body to receive a stem of the valve, so that the stem moves within the bore to move a control member in the flow passage to control flow through the flow passage;
   a first packing arrangement arranged in the bore about a first portion of the stem;
   a second packing arrangement arranged in the bore about a second portion of the stem so that the first packing arrangement is located between the second packing arrangement and the valve body, the first packing arrangement configured to, during normal operation, passively leak at a first leakage rate that is greater than a second leakage rate of the second packing arrangement, for a given pressure drop, when the control member is in an open position, and an inter-packing volume being defined in the bore between the first packing arrangement and the second packing arrangement; and
   a bore port extending through the bonnet and opening into the inter-packing volume of the bore, the bore port providing fluid communication between the inter-packing volume and the outlet of the valve body.

2. The packing system of claim 1, wherein the bore port is in fluid communication with the outlet of the valve body via an outlet port that opens into a portion of the flow passage that is downstream of the control member, the bore port and the outlet port being in fluid communication via an external flow path that extends outside of the valve body and the bonnet.

3. The packing system of claim 1, wherein the bore port is in fluid communication with the outlet of the valve body via a bonnet passage extending within a body of the bonnet.

4. The packing system of claim 3, wherein the bonnet passage extends within the body of the bonnet, from the bore port to an interface between the bonnet and the valve body, and
   wherein a check valve is disposed within the bonnet to control flow along the bonnet passage.

5. The packing system of claim 3, wherein a bonnet port extends through the bonnet to be in fluid communication with the flow passage via an interface between the bonnet and the valve body, and
wherein the bore port and the bonnet port are in fluid communication via a flow path that is external to the bonnet.

6. The packing system of claim 1, wherein first packing arrangement includes a labyrinth seal.

7. The packing system of claim 1, further comprising:
a pressure relief valve in communication with the bore port and the outlet of the valve body to define a set pressure for flow between the bore port and the outlet of the valve body.

8. The packing system of claim 7, further comprising:
a first pressure sensor arranged upstream of the pressure relief valve in fluid communication with the bore port;
a second pressure sensor arranged downstream of the pressure relief valve in fluid communication with the outlet of the valve body;
a temperature sensor arranged to measure temperature of flow from the bore port to the outlet of the valve; and
a block valve configured to selectively provide a bypass flow that bypasses the pressure relief valve.

9. The packing system of claim 1, wherein the first and second packing arrangements are arranged entirely within the bonnet.

10. A valve assembly comprising:
a valve body including an inlet, an outlet, and a flow passage extending between the inlet and the outlet;
a bonnet mounted to the valve body and having a bore that opens into the valve body;
a stem extending through the bore and operatively connected to a control member arranged in the flow passage, the stem being configured to move the control member between a closed position and an open position to control flow through the flow passage;
a first packing arrangement arranged in the bore about a first portion of the stem;
a second packing arrangement arranged in the bore about a second portion of the stem, the second packing arrangement being downstream of the first packing arrangement along a leakage flow path through the bore; and
a bore port extending through the bonnet to provide fluid communication between (i) an inter-packing location of the bore that is between the first packing arrangement and the second packing arrangement, and (ii) the outlet of the valve body;
wherein the first packing arrangement is configured to, during normal operation, passively leak at a first leakage rate that is greater than a second leakage rate of the second packing arrangement, for a given pressure drop, when the control member is in the open position.

11. The valve assembly of claim 10, wherein the bore port is in fluid communication with the outlet of the valve body via an outlet port that extends through an outlet portion of the valve body to receive flow from a location in the flow passage that is downstream of the control member.

12. The valve assembly of claim 11, wherein the outlet port is in fluid communication with the flow passage via a pitot tube that is arranged within the flow passage so that flow from the control member to the outlet within the flow passage generates a reduced pressure at the pitot tube.

13. The valve assembly of claim 11, wherein the outlet port is in fluid communication with the flow passage via a venturi tube that is arranged within the flow passage so that flow from the control member to the outlet within the flow passage generates a reduced pressure at the venturi tube.

14. The valve assembly of claim 10, wherein the bore port is in fluid communication with the outlet of the valve body via a bonnet passage that extends through a portion of the bonnet adjacent to the control member.

15. The valve assembly of claim 14, wherein the control member is surrounded by a cage within the valve body, and
wherein the bonnet passage is in fluid communication with the outlet of the valve body via a cage passage that extends through a portion of the cage.

16. The valve assembly of claim 10, wherein the first packing arrangement is a labyrinth seal.

17. The valve assembly of claim 10, wherein the bore port extends from the inter-packing location to a vacuum source.

18. A method of evaluating a seal provided by a packing system for a valve, with respect to a leakage flow path from the valve that extends between an area of system pressure for the valve and an exterior of the valve, the method comprising:
determining a rate of increase of an inter-packing pressure, the inter-packing pressure being a pressure of an inter-packing volume that is along the leakage flow path between an upstream packing arrangement and a downstream packing arrangement of the packing system, the upstream packing arrangement configured to, during normal operation, passively leak at a first leakage rate that is greater than a second leakage rate of the downstream packing arrangement for a given pressure drop;
determining a reference pressure at a reference location that is downstream of the inter-packing volume along a sensing flow path, the sensing flow path providing fluid communication between the inter-packing volume and an outlet of the valve; and
calculating a leakage rate of the upstream packing arrangement of the packing system based on the rate of increase and the reference pressure.

19. The method of claim 18, further comprising, before determining the rate of increase of the packing pressure:
opening a block valve to place the inter-packing volume in fluid communication with the reference location so that the inter-packing pressure decays to the reference pressure via the block valve; and
after the inter-packing pressure decays to the reference pressure, closing the block valve.

20. The valve assembly of claim 17, wherein the bore port is in fluid communication with the vacuum source that includes a pump configured to draw pressure from the inter-packing location within the bore.

* * * * *